United States Patent
Venkatanarayanan et al.

(10) Patent No.: US 11,640,241 B2
(45) Date of Patent: May 2, 2023

(54) REMOTE STORAGE OBJECT TECHNIQUES

(71) Applicant: Dell Products L.P., Hopkinton, MA (US)

(72) Inventors: Prakash Venkatanarayanan, Bangalore (IN); Nagasimha G. Haravu, Apex, NC (US); Matthew Long, Uxbridge, MA (US); Nagapraveen Veeravenkata Seela, Cary, NC (US); Hemalatha Subramanian, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/480,586

(22) Filed: Sep. 21, 2021

(65) Prior Publication Data

US 2023/0091948 A1 Mar. 23, 2023

(51) Int. Cl.
*G06F 3/06* (2006.01)

(52) U.S. Cl.
CPC ............ *G06F 3/0604* (2013.01); *G06F 3/067* (2013.01); *G06F 3/0613* (2013.01); *G06F 3/0622* (2013.01); *G06F 3/0635* (2013.01); *G06F 3/0659* (2013.01)

(58) Field of Classification Search
CPC ...... G06F 3/0604; G06F 3/0613; G06F 3/067; G06F 3/0635; G06F 3/0659; G06F 3/0622
See application file for complete search history.

(56) References Cited

U.S. PATENT DOCUMENTS

| | | | | |
|---|---|---|---|---|
| 10,866,742 | B1* | 12/2020 | Patterson | ................ G06F 3/067 |
| 2008/0184125 | A1* | 7/2008 | Suleiman | .............. G06F 3/0643 |
| | | | | 715/734 |
| 2016/0162438 | A1* | 6/2016 | Hussain | .............. H04L 67/1097 |
| | | | | 709/212 |
| 2021/0258368 | A1* | 8/2021 | Cassidy | ................. H04L 67/06 |
| 2022/0229734 | A1* | 7/2022 | Seela | .................. G06F 11/1461 |

* cited by examiner

*Primary Examiner* — Mark A Giardino, Jr.
(74) *Attorney, Agent, or Firm* — Muirhead and Saturnelli, LLC

(57) ABSTRACT

A data path connection can be established between a target of a remote source system and an initiator of a local destination system. A storage object of the remote source system exposed over such a data path connection can be mapped to a local storage object name of the local destination system. Such a remote storage object of the remote source system can be accessed as a local storage object of the local destination system using the local storage object name. Within the destination system, the local storage object name of the destination system can be used as a proxy to access the remote storage object of the remote source system. Accessing the remote storage object from the destination system can be used in several data mobility use cases, including, but not limited to, offloaded data copy across arrays, snapshot mobility and backup use-cases.

21 Claims, 12 Drawing Sheets

Destination DS Configuration Information

Logical Device or LUN table 702

| Volume or LUN ID 702a | LUN Information 702b |
|---|---|
| LUN H1 | Information 1 |
| LUN H2 | Information 2 |
| .. | |

Remote storage object mapping table 710

| Remote storage object ID 710a | Local name 710b | Remote storage object information 710c |
|---|---|---|
| LUN Q | LUN V5 | Remote storage object information 1 |
| LUN AA | LUN V2 | Remote storage object information 2 |
| LUN BB | LUN V3 | Remote storage object information 3 |
| .. | | |

FIG. 6B

REMOTE STORAGE OBJECT TECHNIQUES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein may include a computer-implemented method, a system and a non-transitory computer readable medium comprising: establishing a control path session over a control path connection between a first system and a second system; establishing one or more data path connections between the first system and the second system; selecting, over the control path session, a remote storage object of the second system; exposing, over a first target of the second system, the remote storage object of the second system to a first initiator of the first system, wherein the remote storage object is exposed over a first of the one or more data path connections between the first system and the second system and wherein the first data path connection is between the first initiator and the first target; mapping the remote storage object of the second system to a first local storage object name in the first system, and wherein, as a result of said mapping, the first local storage object name is used in the first system as a proxy to access the remote storage object of the second system as a first local storage object of the first system; and performing first processing on the first system to service a copy operation that copies data between the remote storage object of the second system and a second storage object of the first system, wherein the first processing includes: creating a first I/O operation in connection with servicing the copy operation, wherein said creating includes translating the first local storage object name associated with the remote storage object to a remote storage object identifier associated with the remote storage object; and issuing the first I/O operation, that is directed to the remote storage object, over the first data path connection from the first system to the second system.

In at least one embodiment, processing can include selecting a first remote system adapter from a plurality of remote system adapters, wherein each of the plurality of remote system adapters corresponds to a different supported remote system type to which the first system is allowed to connect, wherein the first remote system adapter corresponds to a first supported system type, and wherein the second system is the first supported system type. The first remote system adapter can perform first processing including: said establishing the control path session, said establishing said one or more data path connections between the first system and the second system, selecting said remote storage object of the second system, and said exposing the remote storage object of the second system to the first initiator of the first system. The first system and the second system can communicate over the one or more data path connections using a first protocol, and wherein the first processing performed by the first remote system adapter can include customized processing in accordance with the first protocol.

In at least one embodiment, the first processing can include creating an access control structure used by the second system to allow the first system to access the remote storage object of the second system, wherein the access control structure allows the remote storage object of the second system to be accessible to first initiator of the first system over the first target of the second system. The access control structure can be used in exposing the remote storage object of the second system to the first initiator of the first system.

In at least one embodiment, processing can include testing the access control structure. Processing can also include discovering, by the first system and in accordance with the access control structure, one or more remote storage objects of the second system that are accessible to the first system over the one or more data path connections, wherein said plurality of remote storage objects includes the remote storage object.

In at least one embodiment, the copy operation can be an offload copy operation that copies data between the remote storage object of the second system and the second storage object of the first system. The copy operation can copy data from the remote storage object of the second system to the second storage object of the first system, and wherein the first I/O operation can be a read operation that reads first data from the remote storage object. Processing can further include: returning the first data from the second system to the first system; and responsive to receiving the first data at the first system, writing the first data to the second storage object.

In at least one embodiment, the copy operation can copy data from the second storage object of the first system to the remote storage object of the second system, and wherein the first I/O operation can be a write operation that writes first data of the second storage object to the remote storage object. Processing can further include: sending the first data of the write operation from the first system to the second system; and responsive to receiving the first data at the second system, writing the first data to the remote storage object.

In at least one embodiment, the second storage object can be a logical device and the remote storage object can be a logical device.

In at least one embodiment, the second storage object can be a logical device and the remote storage object can be a snapshot of a logical device.

In at least one embodiment, the second storage object can be a logical device and the second system can be included in a data storage cloud where the remote storage object is a cloud storage object of the data storage cloud.

In at least one embodiment, the second storage object can be a logical device, the second system can be a backup system, and the remote storage object can a backup storage object having a customized format in accordance with the backup system.

In at least one embodiment, the second storage object is a logical device, the second system can be a data archive system, and the remote storage object can be a data archive storage object having a customized format in accordance with the data archive system.

In at least one embodiment, processing may further comprise: receiving the copy operation at the first system, wherein the copy operation includes the remote storage object identifier denoting the remote storage object, wherein the copy operation includes a second storage object identifier denoting the second storage object, wherein the copy operation identifies one of the remote storage object and the second storage object as a source of the copy operation and identifies another of the remote storage object and the second storage object as a destination of the copy operation, wherein a first table of the first system includes local storage object information describing local storage objects configured in the first system, and wherein a second table of the first system includes information about remote storage objects discovered by the first system; and responsive to receiving the copy operation at the first system, performing third processing including: determining, by the first system using the first table, that the remote storage object identifier does not match any local storage object identifier in the first table; responsive to determining that the remote storage object identifier does not match any local storage identifier of the first table, determining by the first system that the remote storage object identifier does not identify a local storage object of the first system; determining, by the first system, that the remote storage object identifier matches an existing remote storage object identifier included in an entry of the second table, wherein the entry indicates that the existing remote storage object identifier of the entry is mapped to the first local storage object name; and responsive to determining the remote storage object identifier matches the existing remote storage object identifier of the entry of the second table, determining that the remote storage object identifier is mapped to the first local storage object name which is used a proxy to access the remote storage object of the second system as the first local storage object of the first system. The first system and the second system can communicate over the first data path connection using a particular protocol, wherein the entry of the second table including the existing remote storage object identifier can be associated with another identifier used to identify the remote storage object in accordance with a particular protocol on the first data path, and wherein the first I/O operation can include the another identifier.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 6B is an example of tables of information that can be used in at least one embodiment in accordance with the techniques herein.

DETAILED DESCRIPTION OF EMBODIMENT(S)

Figure 1:
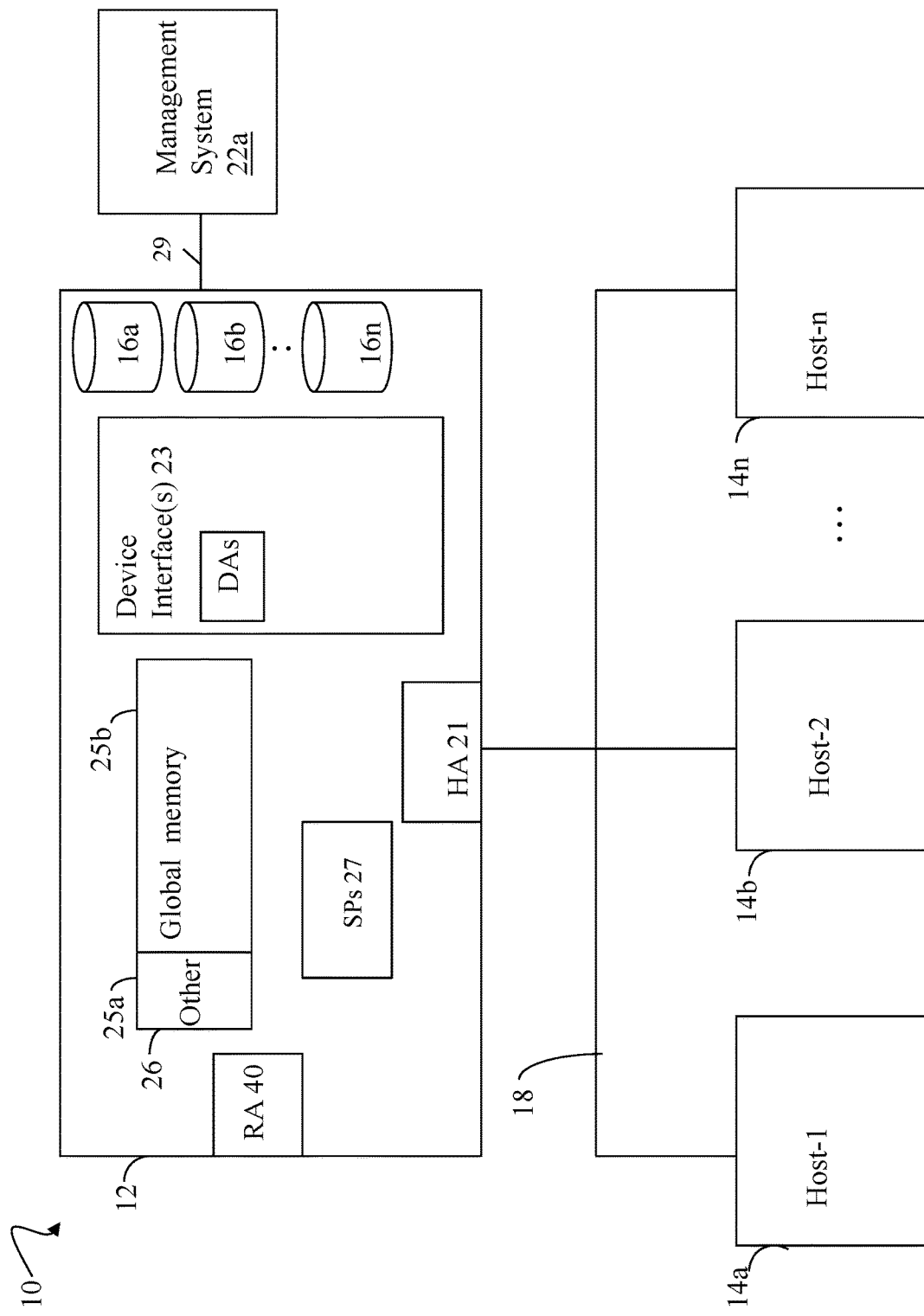
FIG. 1 is an example of components included in a system in accordance with the techniques described herein.

Referring to the FIG. 1, shown is an example of an embodiment of a system 10 that is used in connection with performing the techniques described herein. The system 10 includes a data storage system 12 connected to the host systems (also sometimes referred to as hosts) 14a-14n through the communication medium 18. In this embodiment of the system 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n access and communicate with the data storage system 12, and also communicate with other components included in the system 10.

Each of the host systems 14a-14n and the data storage system 12 included in the system 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the system 10 can use a variety of different communication protocols such as block-based protocols (e.g., SCSI, Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, directors or interface components, such as an HA 21 (host controller or director), RA 40 (remote controller or director), and/or device interface(s) 23. Each of the controllers, directors or interface components can be implemented using hardware including a processor with a local memory with code stored thereon for execution in connection with performing different operations. The HAs are used to manage communications and data operations between one or more host systems and the global memory (GM). In an embodiment, the HA is a Fibre Channel director (FA) or other director which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk directors or controllers (DAs) for interfacing with the flash drives or other physical storage devices (e.g., PDS 16a-n).

The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or directors, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that includes reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

As noted above, in at least one embodiment of the present disclosure, the data storage system includes a snapshot facility used to create a snapshot of a storage object, such as a LUN or logical device, or more generally any storage object or entity. A snapshot of a storage object such as a LUN or logical device appears like a normal logical device and can be used for backup, testing, and the like. In at least one embodiment, the snapshot facility takes snapshots of storage objects in a single data storage system. Snapshots rely, for example, on a copy on first write (COFW) or another technique to track source logical device changes from the time when a snapshot is created. Any writes to the source logical device result in processing by the snapshot facility, for example, to copy the original data into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots is generally considerably less than that of the source device. Though a snapshot of a source logical device can be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing snapshot facility, COFW is only one example of a technology or a technique used in connection with creating snapshots. More generally, the snapshot facility can use any suitable technique to create snapshots of storage objects. As another example, the snapshot facility can user a redirect on Write (ROW) technique to create snapshots. With ROW, after the snapshot facility takes or creates a snapshot of a source logical device or LUN, new writes to the source LUN or logical device are redirected and thus written to a new location.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
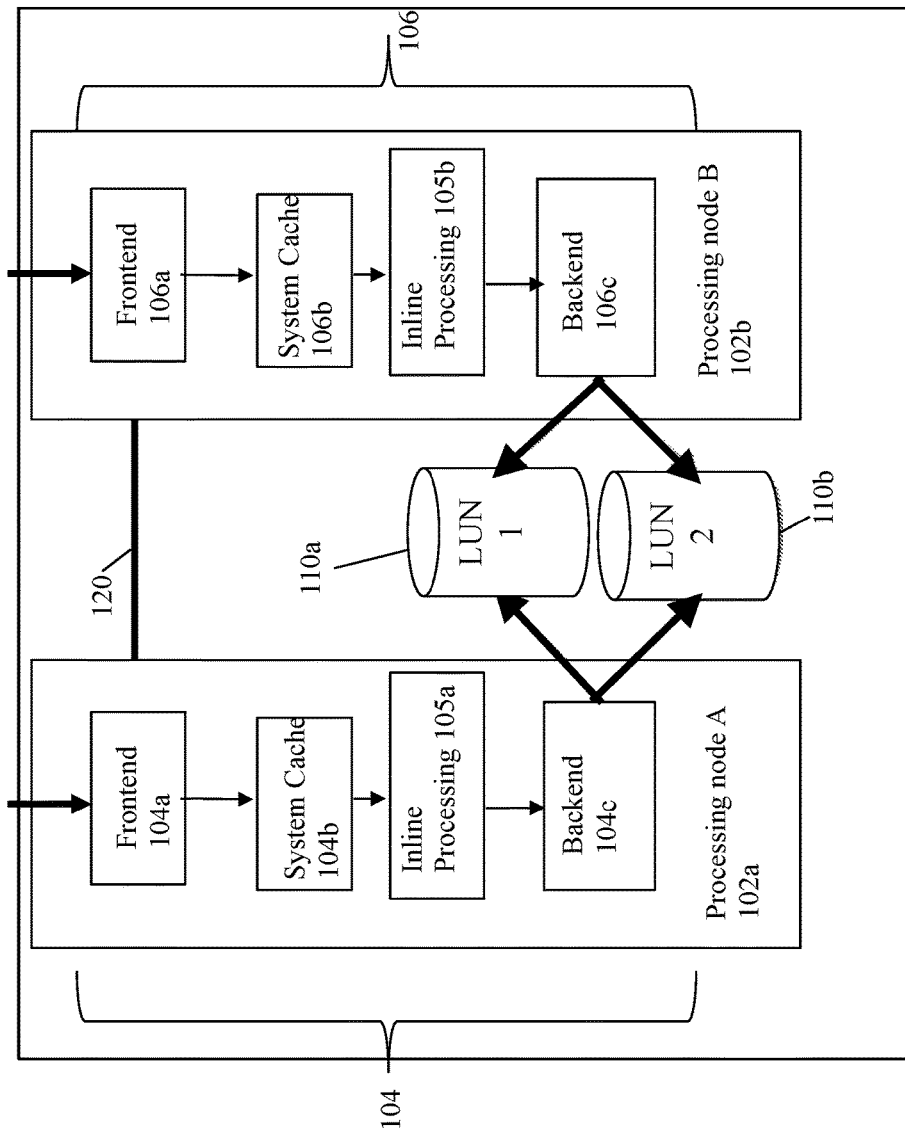
FIG. 2 is an example illustrating the PO path or data path in connection with processing data in an embodiment in accordance with the techniques herein.

With reference to the FIG. 2, shown is an example 100 illustrating components included in the data path in at least one existing data storage system in accordance with the techniques herein. The example 100 includes two processing nodes A 102a and B 102b and the associated software stacks 104, 106 of the data path, where I/O requests are received by either processing node 102a or 102b. In the example 200, the data path 104 of processing node A 102a includes: the frontend (FE) component 104a (e.g., an FA) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing is performed by layer 105a. Such inline processing operations of 105a is optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing includes, for example, performing one or more data reduction operations such as data deduplication or data compression. The inline processing includes performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is directed to a location or logical address of a LUN and where data is read from, or written to, the logical address. The LUNs 110a, 110b are examples of storage objects representing logical storage entities included in an existing data storage system configuration. Since, in this example, writes, or more generally I/Os, directed to the LUNs 110a, 110b are received for processing by either of the nodes 102a and 102b, the example 100 illustrates what is also be referred to as an active-active configuration.

In connection with a write operation received from a host and processed by the processing node A 102a, the write data is written to the system cache 104b, marked as write pending (WP) denoting it needs to be written to the physical storage 110a, 110b and, at a later point in time, the write data is destaged or flushed from the system cache to the physical storage 110a, 110b by the BE component 104c. The write request is considered complete once the write data has been stored in the system cache whereby an acknowledgement regarding the completion is returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be optionally performed. For example, the inline processing can include performing data compression processing, data deduplication processing, and the like, that convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 is used for internode communication between the nodes 102a, 102b.

In connection with at least one embodiment in accordance with the techniques herein, each processor or CPU includes its own private dedicated CPU cache (also sometimes referred to as processor cache) that is not shared with other processors. In at least one embodiment, the CPU cache, as in general with cache memory, is a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache in at least one embodiment is substantially faster than the system RAM used as main memory, where the processor cache contains information that the processor will be immediately and repeatedly accessing. The faster memory of the CPU cache, for example, runs at a refresh rate that's closer to the CPU's clock speed, which minimizes wasted cycles. In at least one embodiment, there are two or more levels (e.g., L1, L2 and L3) of cache. The CPU or processor cache includes at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor is the closest of all cache levels (e.g., L1-L3) to the processor which stores copies of the data from frequently used main memory locations. Thus, the system cache as described herein includes the CPU cache (e.g., the L1 level cache or dedicated private CPU/processor cache) as well as other cache levels (e.g., the LLC) as described herein. Portions of the LLC are used, for example, to initially cache write data which is then flushed to the backend physical storage such as BE PDs providing non-volatile storage. For example, in at least one embodiment, a RAM based memory is one of the caching layers used as to cache the write data that is then flushed to the backend physical storage. When the processor performs processing, such as in connection with the inline processing 105a, 105b as noted above, data is loaded from the main memory and/or other lower cache levels into its CPU cache.

In at least one embodiment, the data storage system is configured to include one or more pairs of nodes, where each pair of nodes is generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure includes the minimum single pair of nodes and up to a specified maximum number of PDs. In some embodiments, a single base enclosure can be scaled up to have additional BE non-volatile storage using one or more expansion enclosures, where each expansion enclosure includes a number of additional PDs. Further, in some embodiments, multiple base enclosures are grouped together in a load-balancing cluster to provide up to the maximum number of node pairs. Consistent with other discussion herein, each node includes one or more processors and memory. In at least one embodiment, each node includes two multi-core processors with each processor of the node having a core count of between 8 and 28 cores. In at least one embodiment, the PDs are all non-volatile SSDs, such as flash-based storage devices and storage class memory (SCM) devices. It should be noted that the two nodes configured as a pair are also sometimes be referred to as peer nodes. For example, the node A 102a is the peer node of the node B 102b, and the node B 102b is the peer node of the node A 102a.

In at least one embodiment, the data storage system is configured to provide both block and file storage services with a system software stack that includes an operating system running directly on the processors of the nodes of the system.

In at least one embodiment, the data storage system is configured to provide block-only storage services (e.g., no file storage services). A hypervisor can be installed on each of the nodes to provide a virtualized environment of virtual machines (VMs). In at least one embodiment, the system software stack executes in the virtualized environment deployed on the hypervisor. In at least one embodiment, the system software stack (sometimes referred to as the software stack or stack) includes an operating system running in the context of a VM of the virtualized environment. Additional software components can be included in the system software stack and can also execute in the context of a VM of the virtualized environment.

In at least one embodiment, each pair of nodes is configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not be shared with other pairs of nodes. A host can access data stored on a BE PD through the node pair associated with, or attached to, the PD.

In at least one embodiment, each pair of nodes provides a dual node architecture where both nodes of the pair are generally identical in terms of hardware and software for redundancy and high availability. Consistent with other discussion herein, each node of a pair performs processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair includes its own resources such as its own local (i.e., used only by the node) resources such as local processor(s), local memory, and the like.

The mobility of customer data from one data storage system to another storage system remains a challenge due to complexities and technological advances in connection with data storage systems. Data mobility typically includes a wide range of applications or use cases in which user or customer data is moved, migrated, or copied between systems. Data mobility includes, for example, migrating user data between storage systems, where the user data includes storage objects, such as LUNs and snapshots of LUNs. Data mobility includes, for example, data cloning of storage objects, such as LUN snapshots where the snapshots of one system are cloned or copied for storage and use on a second system. In connection with clones, the cloned object is a complete and separate physical copy of the original source object. Clones of snapshots or other storage objects can be used for data archival and/or restoration purposes. For example, clones of storage objects, such as LUN snapshots, can be stored on a data archival or backup system. At a later point in time, an archived storage object can be restored from the data archival or backup system to another system. It should be noted that some backup systems and/or data archive systems store their respective storage objects in a customized or proprietary format for the particular backup or archival system.

In connection with data mobility scenarios such as those examples noted above, there is a general need for a first system to access remote storage objects of a remote second system. In connection with achieving the desired access, challenges exist. In order for the first system to access the storage objects of the second remote system, the first system typically needs control path access and data path access to the second system and its storage objects. The control path access is typically provided using techniques and protocols such as, for example, HTTPS (Hypertext Transfer Protocol Secure), SSL (Secure Socket Layer), and authentication techniques using credentials and/or certificates. However, providing the first system the needed data path access to the second system and the desired storage objects is usually laborious and typically uses non-standard techniques and protocols. Additionally, providing the first system the necessary access, on both the control path and the data path, can further complicated when the second remote system is from a different product family or vendor than the first system. In some cases, the second remote system is not a data storage system, such as a data storage array, but is rather a specialized back-up or archival system having its own protocols unlike typical standard protocols, such as the SCSI (Small Computer System Interface) and NVMe (Non-Volatile Memory Express) protocols. Thus, an existing implementation can use various disparate techniques to provide the first system with the necessary access to the remote second system and the desired storage objects of the remote second system.

To further illustrate shortcomings with respect to data mobility applications in existing implementations today, consider the following examples. As a first example, consider one or more hosts each running a hypervisor and also running VMs in the hypervisor. The VMs of a host use data volumes or data stores stored on a first data storage system. For any one of a variety of different reasons, the data volumes or data stores used by the VMs are to be migrated from the first data storage system to a second different data storage system. One existing tool that performs a storage migration of the VM data volumes or data stores from the first data storage system to the second data storage system uses the host-based reads and writes to migrate the desired data. The foregoing host-based reads and writes are expensive and burdensome to the host system processor(s) used to perform the host-based reads and writes.

As another example, various offload copy methods or commands, such as the XCOPY (Extended Copy) command and the ODX (Offloaded Data Transfer) command, can be used for data copying between SCSI targets in the same system. The XCOPY command is a SCSI command included in the SCSI standard. The ODX command is a token-based offload copying command developed Microsoft Corporation. Existing implementations, for example, use XCOPY and/or ODX for copying within a single system but not across or between different data storage systems or appliances.

As yet another example, assume a host needs access to a back-up copy or archived copy of a storage object, such as a backup copy of a LUN or volume. In existing implementations, there is no standard mechanism for the host to access the backup copy of the LUN or volume on a backup or archival system. The backup or archived copy is typically stored in a special backup or archival format and the host may want to directly access the "raw" or unmodified backup copy while in this special backup or archival format without performing a restoration operation that would restore the backup copy to its original form. There is no standard mechanism or technique for the host to access such raw backup or archival forms of a storage object directly. In some existing implementations, for example, a customized process or mechanism can be developed for each backup or archival system to provide any allowable access to the backups or archives of storage objects. Thus, existing implementations that provide access of the raw backup or archived objects to the host are typically varied depending on the particular backup or archival system.

As yet another example, assume there is an application, such as a volume management or database, on a host system. Assume further there is a need to move LUN snapshots used by the application between two heterogeneous data storage systems of different types. At least one existing implementation provides a customized host-based solution for the particular types of data storage systems. Thus, existing implementations that perform the desired movement of LUN snapshots between the two heterogeneous systems are typically varied and complex depending on the particular storage systems. Additionally, such existing implementations using host-based solutions consume host resources, for example, to move storage objects such as snapshots between storage systems. For example, the host-based solution can include the host issuing command to read the data from a first system and write the data to a second different system.

Described in the following paragraphs are techniques that may be used to provide the first system with the necessary control path and data path access to the remote second system and the desired storage objects of the remote second system. In at least one embodiment, the first system includes a novel feature that provides the first system remote access to the desired storage objects of the remote second system. For example, the storage objects of the remote second system can be LUNs, logical devices or volumes, and where the techniques herein are used to provide the first system with remote volume access to the LUNs, logical devices or volumes of the second remote system. An another example, the storage objects of the remote second system can be snapshots of LUNs, logical devices or volumes, and where the techniques herein are used to provide the first system with remote volume access to the snapshots of the LUNs, logical devices or volumes of the second remote system. An another example, the storage objects of the remote second system can be cloud objects or generally any special-purpose data object, and where the techniques herein are used to provide the first system with remote volume access to the such objects of the second remote system.

In at least one embodiment of the techniques herein, the first system is provided with the access to the second system and its remote storage objects using remote system adapters. In at least one embodiment, the remote system adapters include a different adapter for each type of remote system accessibility that is supported. Each adapter performs customized processing that varies with each such type of remote system that can be accessed by the first system. In this manner, the varied or different processing performed to provide the first system with the needed access to the control path and data path of a particular type of remote second system is embodied within a corresponding remote system adapter for the particular type of remote second system.

In at least one embodiment, the techniques herein provide for discovery of the remote system and its storage objects, such as its LUNs and snapshots.

In at least one embodiment, the techniques herein provide for accessing and mapping a remote storage object of the second remote system into the first system's I/O stack of the I/O path or data path so that the first system can access the remote storage object of the second remote system as a local storage object of the first system. For example, the remote storage object can be a LUN where the remote LUN of the second system is mapped into the first system's local I/O stack of the I/O path or data path and can be accessed as a local LUN of the first system. The remote LUN can be mapped as if it were a local LUN in the local volume namespace, more generally in the local object namespace, of the first system. In this manner in at least one embodiment, the first system accesses the remote LUN of the remote second system as a local LUN of the first system. For example in at least one embodiment, the remote LUN can be mapped to a local volume name (more generally referred to herein sometimes as a storage object name and sometimes referred to herein as a local name) of the local volume namespace (more generally local object namespace) of the data path of the first system. The local volume namespace is the particular set of local names used locally by the first system to uniquely identify different logical devices, volumes or LUNs used in the first system. Once the remote LUN of the second system is available and accessible as a local LUN of the first system, the remote LUN may be accessed on the first system as a local LUN in connection with any suitable use case or application, some examples of which are described herein. In at least one embodiment, the local name associated with the remote LUN can be used as a proxy or reference to indirectly access the remote LUN mapped to the local name. In at least one embodiment, the local name used as the proxy can be local and known and used only within the first system.

As one example use case or scenario, consider offload copy operations. In at least one embodiment, a data storage system supports and performs offload copy commands and operations. Generally, the offload copy operation request can be issued by an external data storage system client, such as a host, as well as an internal data storage system client. In at least one embodiment, the offload copy operation or command, such as the XCOPY command noted above, is a request to perform an offload copy operation from a source to a destination or target. The source and the destination of the XCOPY or other offload copy operation can be specified in any suitable manner. For example, in at least one embodiment, the source can identify one or more logical devices or LUNs, and an associated LBA range of each of the one or more LUNs of the source; and the destination can also identify one or more logical devices or LUNs, and an associated LBA range of each of the one or more LUNs of the destination. The particular manner in which the LUNs are identified can vary with the particular protocol used to access the LUNs. For example, in at least one embodiment in accordance with the SCSI protocol, a LUN of the source or destination of the XCOPY command can be identified using the world wide name (WWN) used to uniquely identify the LUN at a protocol level identifier across the first and second systems, or more generally across multiple data storage systems. As another example, in at least one embodiment in accordance with the NVMe protocol, a LUN of the source or destination of the XCOPY command can be identified using the namespace globally unique identifier (NGUID) used to uniquely identify the LUN at a protocol level identifier across the first and second systems, or more generally across multiple data storage systems. Such an offload copy command requests or instructs the data storage system to generally perform an offload copy command internal within the data storage system because both the source and destination of the copy command are within the same data storage system. Generally, the client, such as the host, requests using the XCOPY command that the data storage system manage the copying of the data from the source to the destination. The source and destination of the XCOPY command refer to storage objects, such as block-based addresses of logical devices, volumes, or LUNs, typically in the same system. For example, the source may be a location or logical address on a source device denoting a source LUN of the data storage system that received the XCOPY command. The destination or target of the XCOPY command may be a location or logical address on a target device that is also a logical device denoting the destination or target LUN of the data storage system that received the XCOPY command. However, in accordance with the techniques herein in at least one embodiment, the XCOPY command, or more generally an offload copy command or operation, is received by a data storage system, such as a destination data storage system. The destination data storage system includes the destination or target LUN but the destination data storage system does not include the source LUN which is remotely located in another source system. Using the techniques of the present disclosure, the destination data storage system can identify and access the remote source LUN which is not located within the destination data storage system.

The offload copy operation provides an efficient means to copy data from a source to a destination or target within a data storage system. As an alternative in systems not using the techniques of the present disclosure, if the host does not issue an offload copy command to the data storage system, the host typically issues a read operation to the data storage system to read first data from a source location. Responsive to the read operation, the first data is returned by the data storage system to the host. Subsequently, the host issues a write operation to write the first data to the destination location. Using the offload copy operation rather than the foregoing alternative host issued read and write operations provides for more efficient use of resources of the host, data storage system and SAN or other network connecting the host and data storage system in that, for example, there is reduced network traffic (e.g., the first data is not required to be returned to the host and then sent as write operation payload data for the write operation) and the offload copy operation typically completes the request to copy the data to the destination location in less time and using less host resources as compared to the host issued read and write operations. In connection with the techniques of the present disclosure, the offload copy operation received by a data storage system can be characterized as enhanced or extended to allow for the source and/or destination of the offload copy operation to identify one or more LUNs (or more generally storage objects) remotely located in another data storage system.

In connection with the techniques of the present disclosure in at least one embodiment, a remote source LUN of a remote source system is mapped into the I/O stack of the data path or I/O path of the destination system, whereby the remote source LUN is accessible in the destination system as a local LUN of the destination system. The local LUN can be denoted by a local name used only within the destination system. Also another target LUN can be included in the destination system, where the target LUN is exposed to a host or other client of the destination system. The remote source LUN can also be exposed to the same host or other client via a remote source system in which the remote source LUN is configured. The host can issue commands and operations, such as the XCOPY command and other offload copy operations, to the destination system, where the offload command or operation designates the remote source LUN of the remote source system as the source of the offload copy operation, and where the same offload command or operation also designates the target LUN of the destination system as the destination of the same offload copy operation. For example, as will be described in more detail below such as in connection with FIG. 6A, assume the host issues an offload copy operation to the destination system requesting that the destination system copy data from the remote source LUN (which is configured in a remote source system and mapped to the local name of the local LUN of the destination system) to the target LUN of the destination system. In this manner, the host's offload copy operation requests that the destination system copy data from the remote source LUN (accessed using local name or identifier of the mapped local LUN) to the target LUN. From the client or host's perspective, the offload copy operation command instructs the destination system to control remote copying of data from the remote source LUN (that is mapped to the local LUN of the destination system) to the target LUN of the destination system. From the host's perspective, the source of the offload copy operation is the remote source LUN of source system and the destination of the offload copy operation is the target LUN of the destination system, where the destination system controls the offload copy operation. In at least one embodiment, the remote source LUN is accessible on the destination system as a local LUN of the destination system, whereby the destination system uses the local name of the local LUN within its data path services to perform the requested offload copy operation. In this manner, the local name serves as a proxy or reference to the remote source LUN within the destination system when performing the offload copy operation, and where the data of the remote source LUN is obtained using the mapping of the local name of the local LUN to a remote storage object identifier of the remote source LUN.

In at least one embodiment, the second remote system is a source system and the first system is a destination or target system. In such an embodiment, the second remote system is the source system including remote storage objects that are source storage objects which are copied, migrated or replicated to corresponding storage objects (sometimes referred to as destination or target storage objects) of the destination or target system. In at least one embodiment, the first system, that is the destination or target system, controls the processing performed in accordance with the techniques herein for remote setup to access the remote storage objects. In at least one embodiment, the copying, migrating or replication of the remote storage objects of the remote system is controlled by code executing on the destination system, where data of the remote storage objects is pulled from the remote source system to the destination or target system. In at least one embodiment, each of the remote system adapters provide for remote access between the destination system and one particular type of remote source system, and additionally set up remote access between the destination system and the remote source system thereby providing remote access to the remote storage objects of the remote source system from the destination system. Each of the remote system adapters performs customized processing for a particular type of remote source system to provide the remote setup and access between the two systems allowing the destination system to access the remote storage objects of the destination system as local storage objects of the destination system.

In at least one embodiment, the remote system adapters can comprise multiple adapters including a first adapter used to facilitate setup and access to the remote system and its remote storage objects, where the remote system is included in a first family or type of data storage systems such as a midrange storage system or array. In at least one embodiment, the multiple adapters also include a second adapter used to facilitate setup and access to the remote system and its remote storage objects, where the remote system is included in a second family or type of data storage systems such as a high-end storage system or array. In at least one embodiment, the multiple adapters also include a third adapter used to facilitate setup and access to the remote system and its remote storage objects, where the remote system is a data appliance built for a specific purpose such as a backup appliance storing data backups and/or data archive appliance storing archived data that is not expected to be accessed frequently. In at least one embodiment, the multiple adapters also include a fourth adapter used to facilitate setup and access to remote storage objects included in cloud-based storage. Generally, cloud storage stores data on the Internet through a cloud computing provider which manages and operates data storage as a service. An embodiment may generally include any number of remote system adapters such as any one or more of the foregoing types of remote system adapters, alone or combination with other remote system adapters that can vary with embodiment and supported remote system types.

In at least one embodiment, each of the remote system adapters performs processing needed to facilitate providing the destination system with remote access to the remote source system and its remote storage objects for one type of remote source system. For example, consider a scenario in which the remote storage objects are snapshots of LUNs of the remote system. In at least one type of remote source system, processing to expose the remote snapshots of the remote source system and make them visible to the destination system includes cloning the remote snapshots so that such clones are then exposed and made visible for external access to the destination system. In at least one embodiment, the particular remote system adapter for this one type of remote source system includes cloning the desired remote snapshots when performing processing to provide the destination system the desired remote access to the remote storage objects. In contrast to the foregoing one type of remote source system, another different type or remote source system allows directly exposing the snapshots of the remote source system without cloning. In this latter case, a different remote system adapter for the different type of remote source system omits cloning the remote snapshots when performing processing to provide the destination system with the desired remote access to the remote storage objects that, in this case, are snapshots of LUNs.

Described in the following paragraphs are techniques that provide a new feature or service in a system, such as the destination system. The new feature or service, a remote storage object service, provides the destination system with the remote setup and access to the desired remote storage objects of the remote source system. In this manner in at least one embodiment, the techniques herein may be used in many data mobility applications and use cases where the destination system includes native support through its new feature or service providing the remote setup and access to the remote storage objects of the remote source system.

In illustrating the techniques described in the present disclosure, particular examples are provided in which the remote system is a first system—the source system—which includes remote storage objects that are copied or moved to a second system—the destination system—that controls the movement or migration of the remote storage objects. More generally, the storage objects can be used in embodiments in accordance with the techniques herein in any suitable application or scenario where the storage objects can be moved in either direction with respect to the first and second systems (i.e., the storage objects can be moved from the first system to the second system, and also from the second system to the first system). In at least one embodiment, both the source and destination of an offload copy command can specify LUNs that are remotely located with respect to the data storage system that receives the offload copy command. Generally, the LUNs can be located in one or more other systems that are remotely located with respect to the data storage system the receives the offload copy command.

In the present disclosure, examples are provided with particular types of systems such as a particular data storage system provided by one particular vendor, protocols such as the SCSI protocol, and the like. However, it will be appreciated by those skilled in the art that the techniques herein have broader applicability and use, for example, with any suitable system and protocol.

In connection with the SCSI standard, a path may be defined between two endpoints such as two ports. A command may be sent from an initiator, originator or source with respect to the foregoing path. An initiator such as a first port sends requests to a target, such as a target port, of a data storage system. The initiator and target may each have network addresses. Each physical connection of a path may be between a first endpoint which is an initiator port and a second endpoint which is a target port in the data storage system. Over each such path, one or more LUNs may be visible or exposed to the initiator through the target of the data storage system. An initiator port of a host can issue I/O operations directed to a LUN exposed over a target port of a data storage system. Additionally, in connection with the techniques herein described in the following paragraphs, the two endpoints or ports forming a path in accordance with the SCSI standard are between an initiator of a first system, such as a first data storage system, and a second system, such as a second data storage system. In at least one embodiment of the present disclosure, the first system is a destination data storage system and the second system is a source data storage system where the destination data storage system includes the initiator or initiator port, and the source data storage system includes the target or target port, where one or more storage objects such as LUNs are exposed or visible to the initiator port over the target port.

The following paragraphs describe processing phases or parts including a first part or phase, and a second part or phase. In the first part or phase, remote setup or mapping of desired storage objects is performed. The first part or phase further includes a phase or part 1A to establish control path and data path access between the first system, such as the destination system, and the second system, such as the remote source system. The phase or part 1A generally pairs the first system with the second remote source system. The first phase or part also further includes a phase or part 1B to enable or perform remote storage object mapping for one or more selected remote storage objects. In at least one embodiment, the phase or part 1A is required to be successfully completed prior to commencing performing the phase or part 1B. In at least one embodiment, the phase or part 1A processing can be invoked or triggered as a result of executing any suitable first higher level command for a selected remote system. The first higher level command may be, for example, "Remote system pairing", "Add remote system", or "Connect to remote system". In at least one embodiment, the phase or part 1B processing can be invoked or triggered as a result of executing any suitable second higher level command with respect to a selected remote storage object such as a LUN or snapshot. The second higher level command may be, for example, "Enable remote storage object mapping" or "Perform remote storage object mapping". The first higher level command and the second higher level command can be issued using any suitable interface such as, for example, a GUI, CLI (command line interface), and the like. Once the first phase or part has been successfully completed, a second phase or part of processing is performed. In at least one embodiment the second phase or part includes processing steps and commands that vary with the particular use case or scenario in which the remotely mapped storage objects are utilized.

In at least one embodiment, the first part or phase is based on the destination systems ability to connect to other endpoints using standard networking IP addresses.

Figure 3:
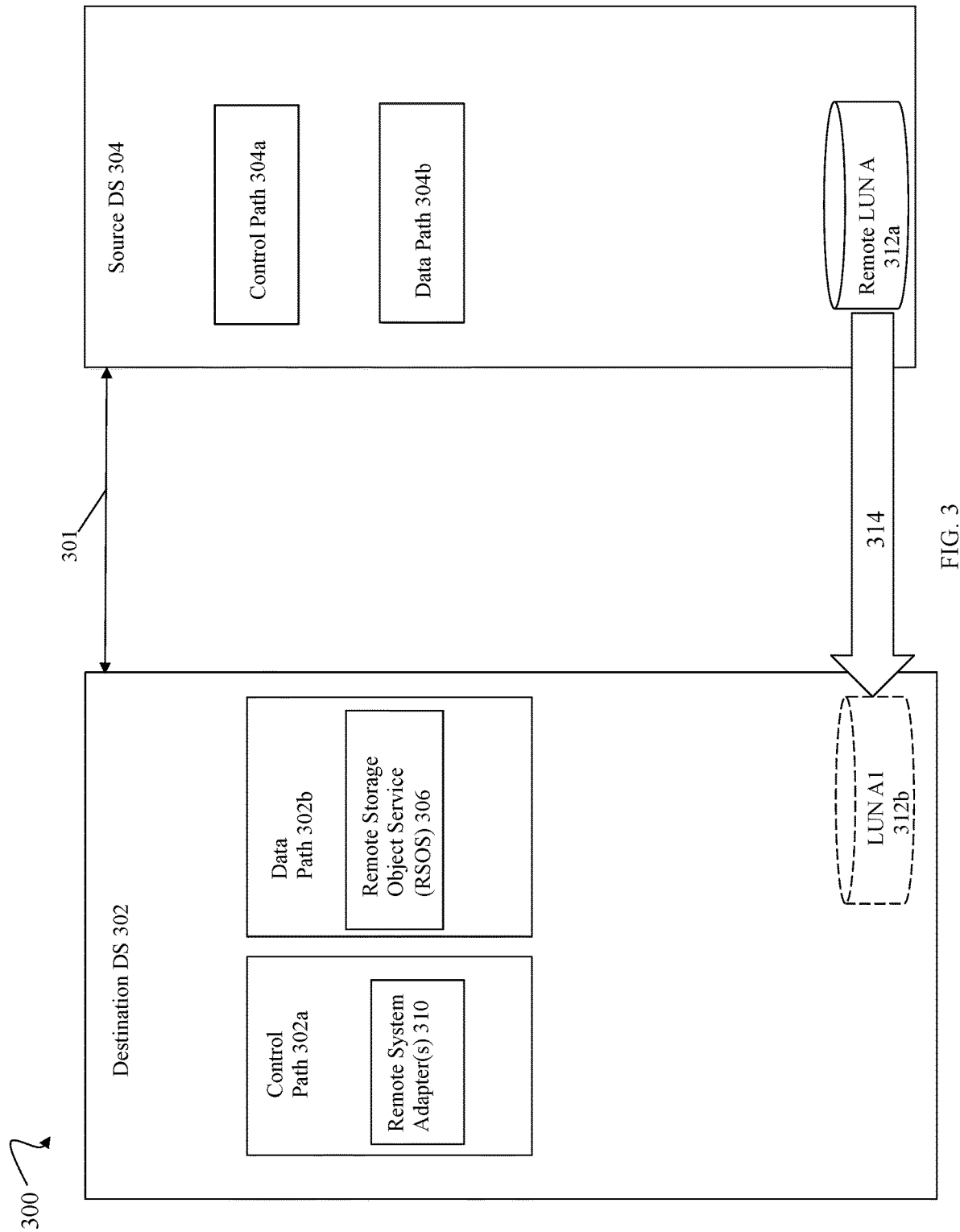
FIGS. 3, 5 and 6A are examples of systems and components included in embodiments in accordance with the techniques herein.

Referring to FIG. 3, shown is an example 300 illustrating data storage systems included in at least one embodiment in accordance with the techniques herein.

The example 300 includes a destination DS (data storage system) 302 and a source DS 304. The system 302 includes the control path 302a and the data path 302b. The data path 302b includes a remote storage object service (RSOS) 306. The control path 302a includes one or more remote system adapters 310. The system 304 includes the control path 304a and the data path 304a.

In at least one embodiment, the destination DS 302 includes the RSOS service 306 that performs processing to implement the techniques of the present disclosure. The destination DS 302 and the source DS 304 communicate over the communication connection 301. In at least one embodiment, the connection 301 is a network connection such as an internet or intranet connection. Generally, the element 301 denotes one or more connections between the systems 302 and 304 used for communications between the control paths 302a and 304a, and used for communications between the data paths 302b and 304b. As described in the following paragraphs, the RSOS 306 performs processing including mapping a remote storage object, such as the remote LUN A 312a, of the system 304 into the I/O stack of the data path or I/O path of the destination 302, where the remote LUN A 312a is locally accessible in the destination DS 302 as the LUN A1 312b. In one embodiment, the remote LUN A 312a is mapped (314) to a corresponding local name or local identifier in the local volume namespace of the destination DS 302 as denoted by the LUN A1 312b. The LUN A1 312b has a dashed outline denoting that the LUN A1 312b is not a provisioned LUN having physical storage on the system 302. Rather the LUN A1 312b denotes a local name or local identifier name (e.g., A1 or LUN A1) used locally in the system 302 to reference the mapped remote LUN A 312a. The local name 312b can be used locally in the system 302 when performing various operations and applications, where the local name 312b is mapped to the remote LUN A 312a. In this manner, other local services on the system 302 can use the local name 312b, and the RSOS 306 can handle mapping the local name 312b to the corresponding remote LUN A 312a to access the remote LUN A 312a and its data as needed for any suitable application or use scenario.

It should be noted that the systems of FIG. 3 include other components than as illustrated in the example 300 for simplicity. More generally, the systems 302 and 304 can include other components, for example, as described in connection with FIGS. 1 and 2. Further detail regarding components included in the system 302 in at least one embodiment are also described in connection with FIG. 5. Additionally, both of the systems 302 and 304 are data storage systems such as, for example, data storage arrays or appliances. More generally the techniques of the present disclosure can be used with any suitable systems 302 and 304. Additional examples of system types allowable or supported in at least one embodiment are discussed elsewhere herein such as, for example, in connection with FIG. 5.

Additionally, the FIG. 3 and subsequent figures and description illustrate use of the techniques herein with a data migration or copy operation where the data is from copied, moved, or migrated from the remote source DS 304 to the destination DS 302. However, more generally, the techniques herein can be used in connection with movement, migration or copying of data between the systems 304 and 302, where the data source is the system 302 and the target is the system 304, and/or where the data source is the system 304 and the target is the system 302. In the present disclosure to illustrate the techniques described herein, reference is made to particular types of storage objects such as, for example, LUNs, snapshots, backup storage objects used by backup systems, archive storage objects used by data archive systems, and/or cloud-based objects as used in data storage clouds. More generally, the techniques of the present disclosure can be used with any suitable storage object.

In the example 300 of FIG. 3, a particular one of the remote system adapters 310 is selected in connection with establishing the necessary control path connection and session between the systems 302 and 304, and also performing data path actions to establish the remote storage object mapping, such as the remote volume or LUN mapping, between the remote LUN A 312a and its corresponding local name, LUN A1 312b. In this manner, the remote storage object mapping in this example may be referred to more specifically as a remote volume mapping or remote LUN mapping since the remote storage object is logical device or volume, the remote LUN A 312a. The particular remote system adapter selected from the available remote system adapters 310 is in accordance with the particular type of remote system. In the example 300, the particular remote system adapter selected is based on the type of the source DS 304. Consistent with other discussion herein, each of the remote system adapters 310 performs customized processing for the different supported remote system types. A particular remote system adapter used for a particular type of remote system understands the remote system's storage objects, such as LUNs and snapshots, and well as the particular protocols used for communicating with the remote system. The processing performed by each of the remote system adapters 310 varies with the customized particular processing performed for a particular type of remote system. For example, the remote system adapters 310 can include a different remote system adapter instance for each of the different types of supported remote systems that the system 302 is allowed to connect to when performing the techniques of the present disclosure. Thus, the system 304 is one of the supported types and has a corresponding one of the remote system adapters 310 used for facilitating communications between the systems 302 and 304 and also, more generally, for performing processing of the techniques of the present disclosure.

In at least one embodiment, the systems 302 and 304 are data storage systems such as described in more detail in connection with FIG. 1. In at least one embodiment, the destination DS 302 is an appliance including one or more pairs of nodes such as illustrated and described in connection with FIG. 2. In such an embodiment, the destination DS 302 can be, for example, a midrange storage system or array. The remote source DS 304 can be, for example, another midrange storage system or array, a higher-end storage system or array, a special purpose built appliance or system such as for data backup or data archival purposes, cloud-based storage, and the like. In at least one embodiment, the remote system adapters 310 can include at least 4 types of remote system adapters: a first remote system adapter selected and used when the remote source DS 304 is a high-end storage system or array that is a different type than the destination DS 302; a second remote system adapter selected and used when the remote source DS 304 is a midrange storage system or array that is the same type as the destination DS 302, a third remote system adapter selected and used with the remote source DS 304 is a special purpose built appliance or system such as for data backup or data archival purposes that is a different type than the destination DS 302, and a fourth remote system adapter selected and used when the remote source DS 304 denotes cloud-based storage that is a different type than the destination DS 302.

Figure 4A:
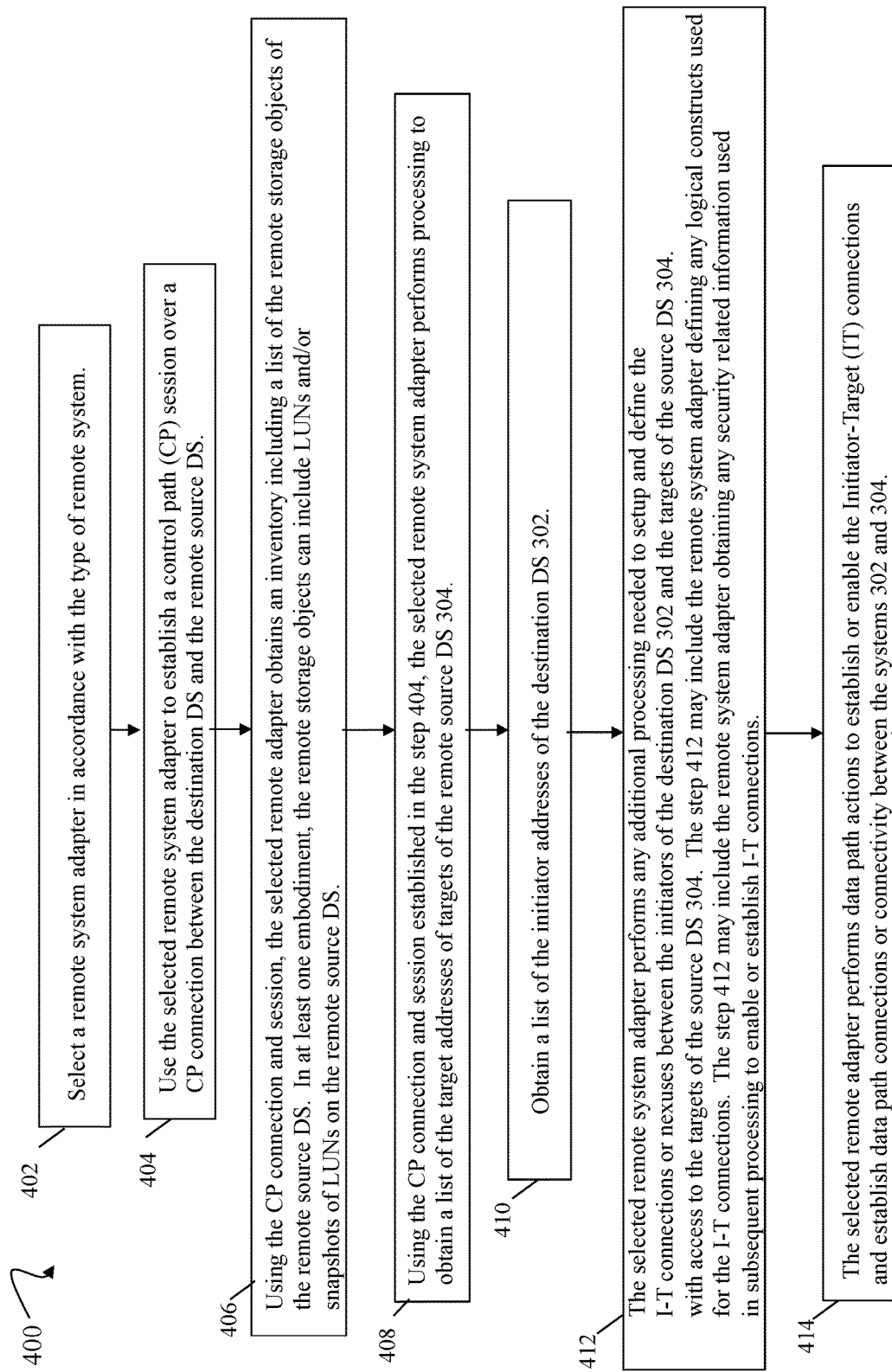
FIGS. 4A, 4B and 6C are flowcharts of processing steps performed in at least one embodiment in accordance with the techniques herein.
Figure 4B:
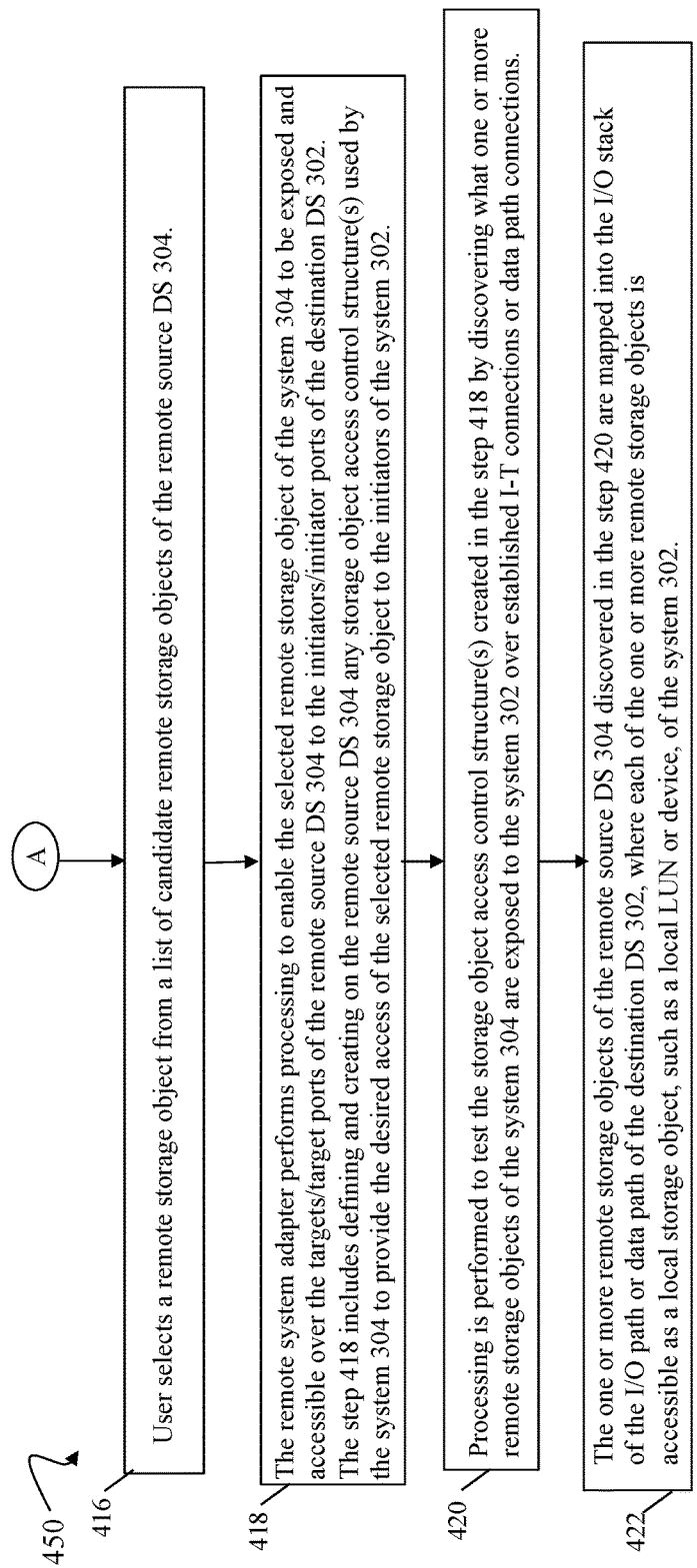

Referring to FIGS. 4A and 4B, shown are processing steps 400, 450 of a flowchart that may be performed in at least one embodiment in accordance with the techniques herein.

In the step 402, a particular one of the remote system adapters 310 of the destination system 302 is selected for use based on the particular type of the source DS 304. In at least one embodiment, the remote system adapter can be selected automatically based on a type associated with the remote source DS 304. As a variation, a user selection can be made, for example, using a management application to select a particular remote system adapter used to connect to a desired remote source DS 304 based on the type of the remote source DS 304. Following the step 402, control proceeds to the step 404.

At the step 404, the remote system adapter selected in the step 402 is used to establish a control path (CP) session over a CP connection between the destination DS 302 and the remote source DS 304. In at least one embodiment, the step 404 can include the selected remote system adapter issuing one or more API calls needed to establish the CP connection and CP session between the systems 302 and 304. For example, the one or more APIs may include one or more REST (Representational State Transfer) API calls that are made using the HTTPS (Hyper Text Transfer Protocol Secure) protocol with the SSL (Secure Socket Layer) protocol.

In connection with the step 404 in at least one embodiment, a user provides credentials and any other required information needed to establish a secure CP connection and session. In turn, the credentials and any other required information are provided to the selected remote system adapter that further provides the credentials to the remote source DS in order to complete any required security authentication to establish the CP connection between the systems 302 and 304. The particular API call(s) needed to establish the CP connection and session can vary with the particular remote system adapter selected and utilized. In this manner, each of the remote system adapters is customized to include the particular API calls and parameters needed to establish a CP connection and session with a different type of remote system. In at least one embodiment, establishing the CP connection and CP session in the step 404 may be characterized as logging into the remote source DS on the management or CP, for example, as an administrator or other authorized user of a management application of the remote source DS. From the step 404, control proceeds to the step 406.

At the step 406, using the CP connection and session established in the step 404, the selected remote system adapter performs processing to obtain an inventory regarding the remote storage objects of the remote system. In at least one embodiment, the remote storage objects can include LUNs and/or snapshots of LUNs on the remote source DS. In at least one embodiment, the inventory of remote storage objects can vary with the type of remote system. For example, in at least one embodiment, a first remote system adapter is selected and used with a first type of remote data storage system that uses storage groups (SGs). The first type of remote data storage system may be, for example, a high-end data storage system. An SG is a logically defined group of one or more LUNs. In the first type of data storage system, particular initiators are granted access to particular LUNs using SGs of the remote system rather than by directly specifying or identifying individual LUNs of the remote system. Thus, when the remote system is the first type of data storage system, the first remote system adapter is selected and used to provide an inventory that includes a list of defined SGs of the remote system and the one or more LUNs of the remote system included in each of the SGs.

In contrast to the first remote system adapter and the first type of data storage system, a second remote system adapter selected and used with a second type of remote data storage system may not use SGs. The second type of remote data storage system may be, for example, a mid-range data storage system. In the second type of data storage system, particular initiators are granted access directly to individual LUNs by directly identifying individual LUNs. Thus, when the remote system is the second type of data storage system, the second remote system adapter is selected and used to provide an inventory that does not include any SGs and rather directly identifies the one or more remote LUNs of the remote system. The step 406 may also include storing on the destination DS 302 the list of remote storage objects of the remote source DS 304. From the step 406, control proceeds to the step 408.

At the step 408, using the CP connection and session established in the step 404, the selected remote system adapter performs processing to obtain a list of the target addresses of targets of the remote source DS 304. The particular type of target addresses can vary with the particular protocol used by the system 302 to communicate with the system 304. For example, in at least one embodiment where the systems 302 and 304 communicate using SCSI over FC, the target addresses are WWNs of the target ports. In an embodiment where the systems 302 and 304 communicate using iSCSI (Internet Small Computer Systems Interface), the target addresses are IP addresses. iSCSI is an Internet Protocol-based storage networking standard providing block-level access to storage devices using SCSI commands over a TCP/IP network. Thus, the selected remote system adapter is customized to communicate with the remote source DS and understand the one or more particular types or kinds of target addresses that can vary with the particular protocol used by the destination DS 302 to communicate with the remote source DS 304. The step 408 may also include storing on the destination DS 302 the list of target addresses of the target ports of the remote source DS 304. From the step 408, control proceeds to the step 410.

At the step 410, processing is performed to obtain a list of the initiator addresses of the destination DS 302. In a manner similar to target addresses as discussed above in connection with the step 408, the particular type of initiator addresses (e.g., of the initiator ports) can vary with the particular protocol used by the system 302 to communicate with the system 304. Thus, the selected remote system adapter is customized to communicate with the remote source DS 304 and understand the one or more particular types or kinds of initiator addresses that can vary with the particular protocol used by the destination DS 302 to communicate with the remote source DS 304. The step 410 may also include storing on the destination DS 302 the list of initiator addresses of the initiator ports of the destination DS 302. In at least one embodiment, processing of the step 410 can be performed using the selected remote system adapter, or more generally, any suitable component of the destination DS 302. From the step 410, control proceeds to the step 412.

At the step 412, the selected remote system adapter performs any additional processing needed to setup and define the I (initiator)-T (target) connections or nexuses between the initiators of the destination DS 302 and the targets of the source DS 304. An I-T *nexus* in terms of the SCSI standard is a relationship between a specific SCSI initiator port (I) and a specific SCSI target port (T) for a given LUN within the SCSI target. More generally, each I-T *nexus* or connection can generally denote a path or connection between two endpoints where the I endpoint acts as an initiator of requests, such as I/O operations, issued to the T endpoint (acting as the receiver). In at least one embodiment, the step 412 includes defining any additional logical constructs using the CP connection and session, where such additional logical constructs are used in subsequent processing (e.g., the step 414) to establish and validate the I-T connections or nexuses. The particular logical constructs utilized may vary with the type of remote system. In at least one embodiment, the particular I-T connections or nexuses are determined in accordance with the particular zoning of the network or SAN fabric, such as a switch, used for the I-T connections. For example, based on the zoning, the list of targets visible by each initiator can vary, whereby the particular I-T connections vary with the particular targets viewed by each initiator.

To further illustrate customized processing that can be performed in connection with the step 412 based on the particular remote system adapter selected and used in accordance with the type of the remote source DS 304, consider the case where the system 304 is a high-end data storage system of the first type noted above. The first type of remote data storage system in one embodiment performs I-T connections between logically defined groups of target ports and logical defined groups of initiator ports. In this first type of remote data storage system, the corresponding remote system adapter for the first type may include performing processing to create or define target ports groups (TPGs) where each TPG includes one or more target ports of the remote source DS 304. Additionally, the corresponding remote system adapter for the first type may include performing processing to define initiator ports groups (IPGs) where each IPG includes one or more initiator ports of the destination DS 302. When the system 304 is the first type, I-T connections between the systems 302 and 304 are defined between an IPG and a TPG. The initiators of the destination DS 302 may be partitioned into multiple defined IPGs and the targets of the remote source DS 304 may be partitioned into multiple defined TPGs.

In contrast to the first type of remote data storage system, the second type of remote storage system denoting a midrange data storage system noted above may group all initiators of a single system together in a different type and granularity of logical grouping than the first type. Thus, for example, all initiators of the system 302 may be included in a single logical initiator group when the second type of remote system adapter is selected for use when the system 304 is the second type.

The step 412 may also include the selected remote system adapter performing processing to obtain security related information used in a subsequent processing step (e.g., step 414) to enable or establish the I-T connections or nexuses for which setup has been performed. In at least one embodiment for a particular I-T connection or *nexus*, the security related information is needed by the initiator to access a particular target and establish or enable the I-T *nexus* between the initiator and the particular target. In at least one embodiment, one supported type of remote data storage system 304 may communicate with the destination DS 302 using the iSCSI protocol which uses an additional authentication protocol in enabling and establishing connectivity used for communication between the systems 302 and 304. For example, the iSCSI protocol used in at least one embodiment in accordance with techniques herein may use the Challenge-Handshake Authentication Protocol (CHAP) to authenticate or validate a network host to a data storage system. In such remote system type using iSCSI, CHAP authentication information, such as authentication credentials including the CHAP secret described below, is required in connection with login information provided by an initiator port, such as of the system 302, attempting to login to a target port, such as of the system 304. Thus, the corresponding remote system adapter for the supported type of remote system using the iSCSI protocol may further perform processing to obtain credentials or authentication information used in connection with CHAP in subsequent processing described below when initiators of the system 302 log into target ports of the system 304.

As known in the art, CHAP is an authentication scheme used by Point to Point Protocol (PPP) servers to validate the identity of remote clients. CHAP periodically verifies the identity of the client by using a three-way handshake. This happens at the time of establishing the initial link (LCP), and may happen again at any time afterwards. The verification is based on a shared secret (such as a password). CHAP authentication uses a challenge and response, which means that the peer (authenticator, such as the remote data storage system 304) challenges the caller (such as initiator of the system 302) to prove its identity. The challenge may include, for example, a random number and a unique ID that is generated by the authenticator. The caller uses the ID, random number, and its CHAP security credentials to generate the proper response (handshake) to send to the peer. CHAP security credentials include a CHAP user name and a CHAP "secret." The CHAP secret is an arbitrary string that is known to both the caller and the peer before they negotiate a PPP link. Thus, CHAP requires that both the initiator, such as the system 302, and the remote data storage system 304 know the CHAP secret although it is not sent over the network. Following is a summary of processing that may be performed using the CHAP authentication scheme:

1. After the completion of the link establishment phase, the authenticator (e.g., remote storage system 304) sends a "challenge" message to the peer (e.g., initiator).

2. The peer responds with a value calculated using a one-way hash function on the challenge and the secret combined.

3. The authenticator checks the response against its own calculation of the expected hash value. If the values match, the authenticator acknowledges the authentication; otherwise it should terminate the connection.

4. At random intervals the authenticator may send a new challenge to the peer and repeats steps 1 through 3 as described above.

Thus, in a system using the iSCSI protocol with CHAP authentication, each of the initiator ports of the destination DS 302 may be required to provide CHAP authentication information in connection with each login command sent to a target port of the remote source DS 304 (e.g., such as may be performed in connection with the step 414 described below). In at least one embodiment, the remote source DS 304 using iSCSI can be configured with the CHAP authentication information prior to the initiator port login command being received. In other words, the system 304 using iSCSI is configured with the valid or expected CHAP authentication information (e.g., that will be recognized as valid) in order to establish connectivity with the target ports of the data storage system.

In an embodiment in accordance with the techniques herein, if the type of the remote source DS 304 uses the iSCSI protocol to communicate with the destination DS 302, the step 410 may include the corresponding remote system adapter for the system 304 obtaining the CHAP authentication information, secret, and/or credentials that will be needed in subsequent processing (e.g., the step 414) for enabling initiator ports of the system 302 to successfully login to target ports of the system 304.

After completing the step 412, the access setup processing on the control or management path is complete. In summary in at least one embodiment, the access setup processing performed on the control path or management path in connection with the steps 402, 404, 406, 408, 410 and 412 include: obtaining a list of remote storage objects, such as LUNs and/or snapshots, of the remote source DS 304; obtaining a list of target addresses of targets of the system 304; obtaining a list of initiator addresses of initiators of the system 302; and performing any additional processing needed to setup the initiators of the destination DS 302 with access to the targets of the source DS 304. The processing to setup the initiators of the system 302 with access to the targets of the system 304 may include, for example, defining additional customized logical constructs (e.g., TPGs, IPGs) that can vary with the type of remote system where such constructs are used to define and establish I-T connections. The processing to setup the initiators of the system 302 with access to the targets of the system 304 may include, for example obtaining CHAP authentication information, credentials or secrets that will be subsequently needed and used by initiator ports of the system 302 to login to target ports of the system 304.

Once the access setup of the control path for the I-T connections is complete after performing the step 412, the selected remote system adapter may perform data path actions in the step 414. The step 414 includes performing any one or more data path actions needed to enable or establish the I-T connections or nexuses between the initiators of the system 302 and the targets of the system 304. As noted above, the step 414 can include an initiator X of the system 302 logging into a target Y of the system 304 to establish or enable the particular I-T connection between X and Y. As also noted above, to successfully complete the target port login can require providing security-related information such as a CHAP secret noted above. The processing performed in the step 414 can vary with the particular type of remote system and the associated remote system adapter. The step 414 can be characterized as establishing data path connections or connectivity between the systems 302 and 304. From the step 414, control proceeds to the step 416.

At the step 416, a user can select one or more remote storage objects from the list discovered and stored from the prior step 406. Subsequent processing is performed to enable remote storage object mapping for the selected storage object. The step 406 may include displaying the list of remote storage objects of the system 304 to the user such as, for example, on a GUI of a management application of the system 302. The user can then subsequently select one or more storage objects from the displayed list of remote storage objects. The storage objects can be selected using a selection or pointing device, such as a mouse, keyboard, trackpad or touchpad, when interacting with the GUI. The particular storage objects displayed and which are available as selection candidates for remote storage object mapping can vary with the particular type of remote source DS 304. For example, as discussed in connection with the step 406, the first type of remote source DS 304 may be a high-end data storage system where the list of remote storage objects include only SGs rather than individual LUNs or snapshots. In contrast, the second type of remote source DS 304 may be a midrange data storage system where the list of remote storage objects does not include SGs and rather includes individual LUNs and snapshots. For simplicity of illustration, assume that the remote source DS 304 is the first type where the list displayed in the step 416 includes only SGs of LUNs or snapshots, as opposed to listing individual LUNs or snapshots for selection. Assume for illustration purposes that in the step 416, the user selects SG1 from the displayed list where SG1 includes only a single LUN A. In at least one embodiment, the selected remote system adapter (e.g., selected in the step 402) can perform the step 416 processing. From the step 416, control proceeds to the step 418.

At the step 418, the remote system adapter (selected in the step 402 for the particular type of remote system 304) performs processing to enable the selected remote storage object of the system 304 to be exposed and accessible over the established I-T connections or nexuses between the targets/target ports of the remote source DS 304 and the initiators/initiator ports of the destination DS 302. The step 418 includes defining and creating on the remote source DS 304 any storage object access control structures (also sometimes referred to as access control structures) used by the system 304 to provide the desired access of the selected remote storage object to the initiators of the system 302. The particular storage object access control structures and associated processing performed by the remote system adapter can vary with the particular access control mechanism used by the system 304.

To further illustrate processing performed in the step 418, assume as discussed above that the remote source DS 304 is the first type of data storage system and in the step 416 the user selects SG1 that only includes the remote storage object LUN A. The first remote system adapter for the first type of remote source DS 304 performs processing to define and create on the remote source DS 304 any storage object access control structures used by the system 304 to provide the desired access of the selected remote storage object to the initiators of the system. In this example where the remote source DS 304 is the first type of data storage system, masking information or a masking view is used as the storage object access control structure by the system 304 to specify which initiators have access to which SGs of LUNs. Put another way, based on zoning, the list of targets exposed to, or viewed by, each initiator can vary. Over each of the targets, LUNs or more generally storage objects of the system 304 may be exposed to zoned initiators. Additionally, based on masking information, initiators are further only allowed access to the exposed LUNs, or more generally storage objects, identified in the masking information. Thus, the step 418 in this example includes the first remote system adapter for the first type of data storage system performing processing to create a masking view or masking information denoting that the one or more LUNs of SG1 are exposed over the I-T connections established in the step 414. Put another way, the masking view or masking information denotes that the one or more LUNs of SG1 are exposed over each of the targets of the system 304 from the list determined in the step 408 to each initiator of the system 302 included in the list determined in the step 410.

The particular storage object access control structure and mechanism can vary with the type of remote system. Thus, the particular processing performed in the step 418 can also vary with the remote system adapter selected for the type of remote system. For example, the first type of storage system noted above using SGs uses masking information as the control or access mechanism within the remote source DS 304 to define which initiators of the destination DS 302 are allowed to access which LUNs of the system 304 exposed over particular target ports of the remote source DS 304.

As another example, another type of remote storage system does not use SGs but may also use a type of masking information as the storage object access control structure and mechanism within the remote source DS 304 to define which initiators of the destination DS 302 are allowed to access which LUNs of the system 304 exposed over particular target ports of the remote source DS 304. Thus even though a remote storage object such as a LUN is exposed through zoning over a target to an initiator, the remote data storage system of the latter type further uses the defined masking information to determine whether a particular initiator is allowed to access a particular LUN exposed over a particular target port. Additionally, the latter type of remote system uses no SGs so that the masking information can directly identify individual LUNs rather than SGs.

In the processing of the step 418 discussed above, the storage access control structure reflects the assumption that the selected one or more remote storage objects are to be exposed or accessible over all established I-T connections. In at least one embodiment as a variation, a user can be allowed to further select or customize which of the established I-T connections over which the one or more remote storage objects are to be exposed. For example, consider the selected SG1 including only the LUN A as discussed above. In such an embodiment, a user can further select, for example, to only expose the selected SG1 including the LUN A over only one particular I-T connection. In this case, the masking view or masking information would reflect the further restriction that the SG1 including the LUN A is only exposed to the destination DS 302 over only the one particular I-T connection. From the step 418, control proceeds to the step 420.

At the step 420, processing is performed to test the storage object access control structure created in the step 418. In at least one embodiment, the step 420 includes performing one or more actions on the established data path connection(s) between the systems 302 and 304. The step 420 includes installing or otherwise using the access control structure(s) (e.g., created in the step 418) on the remote system 304. The one or more actions performed generally provide for discovering what one or more remote storage objects of the remote source DS 304 are exposed or visible to the destination DS 302 over the established I-T connections or data path connections (e.g., established in the step 414). The one or more remote storage objects of the system 304 that are exposed or visible over targets of the system 304 to initiators of the system 302 should be consistent with the access control structure(s) created in the step 418 and also used by the system 304. In one aspect, the one or more actions can be characterized as testing the access provided by the access control structure created in the step 418. The particular one or more actions performed can vary with the particular protocol used for communication over the established I-T connections. For example, for the SCSI protocol, the one or more actions can include the destination DS 302 (as the initiator system) issuing SCSI commands such as REPORT LUNS, INQUIRY, and/or READ CAPACITY, to obtain a list of LUNs exposed, accessible or visible over each I-T connection (e.g., obtain the list of LUNs exposed over each target of the system 304 to each initiator of the system 302). Continuing with the example above for the SG1 including only the remote LUN A of the system 304, the step 420 is expected to determine that only the remote LUN A is exposed, accessible or visible over all I-T connections previously established in the step 414. From the step 420, control proceeds to the step 422.

At the step 422, the one or more remote storage objects of the remote source DS 304 discovered in the step 420 are mapped into the I/O stack of the data path or I/O path of the destination DS 302, where each of the one or more storage objects is accessible as a local storage object, local LUN or local device of the system 302. In at least one embodiment, a discovered remote storage object, such as the remote LUN A of the system 304, can be mapped to a local name or local identifier in the local namespace of the data path in the system 302. The local identifier or local name, such as LUN A1 312b, can be used locally in the system 302 to refer to the remote LUN A of the system 304. In this manner, the remote LUN A of the system 304 can be accessed and referenced as a local LUN or local device of the system 302. The system 302 can use the local name 312b of the mapped remote LUN A 312a of the remote source DS system 304 to access the remote LUN 312a. The local name 312b can be used, for example, by other services in the data path 302b to perform operations, such as offload copy operations. However, the local name 312b is further mapped by the RSOS 306 to the corresponding remote storage object 312a to thereby allow local services of the data path 302b of the system 302 to access the remote storage object 312a. In this manner, the local services of the data path 302b of the system 302 can be further extended for use with remote storage objects (e.g., such as 312a) of the system 304.

In at least one embodiment, each remote storage object can be mapped to a local name or local identifier used only locally or internally in the system 302. Existing services in the system 302 which operate on only local storage objects or local devices of the system 302 can be extended and used with the remote storage object by referencing the local name as a proxy for the remote storage object. In this manner, an existing operation or service, such as an offload copy operation, in the system 302, can be extended for use with a remote storage object, where the operation or service references the local name which appears to the existing operation or service as a local storage object or local device of the system 302. When servicing the offload copy operation at runtime, the local name can be translated to a remote storage object identifier denoting the mapped remote storage object, and then the processing to service or implement the operation can be performed using the mapped remote storage object. For example, if an offload copy operation specifies the local name as the source volume from which data is read, the local name is translated to its associated mapped remote storage object identifier, and then processing can be performed to read the data from the remote storage object. In at least one embodiment, this translation provides for substituting the mapped remote storage object identifier in place of the local name when servicing the offload copy operation. Depending on the protocol and remote storage object identifier, I/O operations such as a read command data block (CDB) of a read I/O operation to data from the remote storage object can specify the remote storage object identifier. As a variation, the mapped remote storage object identifier can be further associated with other information, such as a logical unit number or other identifier, included in the read CDB. Such information, such as the logical unit number of the remote LUN 312a on the remote source DS 304, can be obtained as part of discovery processing performed, for example, in the step 420 of FIG. 4B. In this manner, an existing operation or service can reference the local name as a proxy for its mapped remote storage object, where the translation to, and use of, the mapped remote storage object can be automatically performed when servicing the offload copy operation.

The use of a local name, such as 312b, and mapping to its corresponding remote storage object, such as 312a, is described in more detail in following paragraphs and figures (e.g., FIGS. 5, 6, 7A-B).

In at least one embodiment, processing of the steps 420 and 422 can be controlled by, or performed by, the selected remote system adapter (e.g., selected in the step 402), or more generally, any suitable component(s) on the system 302.

In at least one embodiment using the SCSI protocol, each LUN is assigned a unique WWN that can be used to uniquely identify the same LUN across multiple data storage systems.

Thus with the SCSI protocol, the WWN of the remote LUN A 312a of the system 304 is preserved even after the remote LUN A of the system 304 is mapped to a local name or identifier in the system 302. In this manner, the WWN of the remote LUN A 312a can be used by both the systems 302 and 304 to uniquely identify the LUN A 312a of the system 302, and wherein the mapped local name or identifier LUN A1 312b is also mapped to, or associated with, the WWN of the remote LUN A 312a. As another example in at least one embodiment using the NVMe protocol, each LUN is assigned an NGUID that can be used to uniquely identify the same LUN across multiple data storage systems. Thus with the NVMe protocol, the NGUID of the remote LUN A 312a is preserved even after the remote LUN A 312a of the system 304 is mapped to a local name or identifier, such as LUN A1 312b, in the system 302. In this manner, the NGUID of the remote LUN A 312a can be used by both the systems 302 and 304 to uniquely identify the LUN A 312a of the system 302, and wherein the mapped local name or identifier LUN A1 312b is also mapped to, or associated with, the NGUID of the remote LUN A 312a.

Each instance of the destination DS 302 included in an embodiment can have its own data path architecture and schema used for performing the mapping of a remote storage object of the system 304 into the I/O stack of the data path or I/O path of the system 302 so that the remote storage object is accessible as a local storage object or local device in the data path or I/O path of the system 302. The particular data path architecture and schema of the destination DS 302 can vary with embodiment.

In at least one embodiment, the destination DS 302 can be a dual node appliance as illustrated and described in connection with FIG. 2. As a variation and consistent with other discussion in connection with FIG. 2, the destination DS 302 can be a cluster of multiple dual node appliances. In this latter case where the system 302 includes a cluster of multiple appliances, the processing described above in connection with FIGS. 4A-4B is performed on each of the multiple appliances of the cluster to ensure that any appliance within the cluster can successfully service any application or use case that needs access to the remote storage object as a local storage object or local device of the appliance.

In at least one embodiment, the remote storage object, such as the remote LUN A 312a of the system 304, is mapped to a local name or local identifier (e.g., 312b) of the system 302, where this local name or local identifier is not visible or exposed to a host or other external client of the system 302. In other words, the local name or local identifier (e.g., 312b) of the system 302 can only be used within the system 302 to access the remote LUN 304, and the local name or local identifier is not exposed to the external host. In such an embodiment, the remote LUN A 312a of the system 304 is exposed or directly accessible to a host so that the host can access the LUN A 312a directly.

In at least one embodiment, the steps 402, 404, 406, 408, 410, 412 and 414 may be included in the phase or part 1A noted above; and the steps 416, 418, 420 and 422 may be included in the phase or part 1B noted above.

Figure 5:
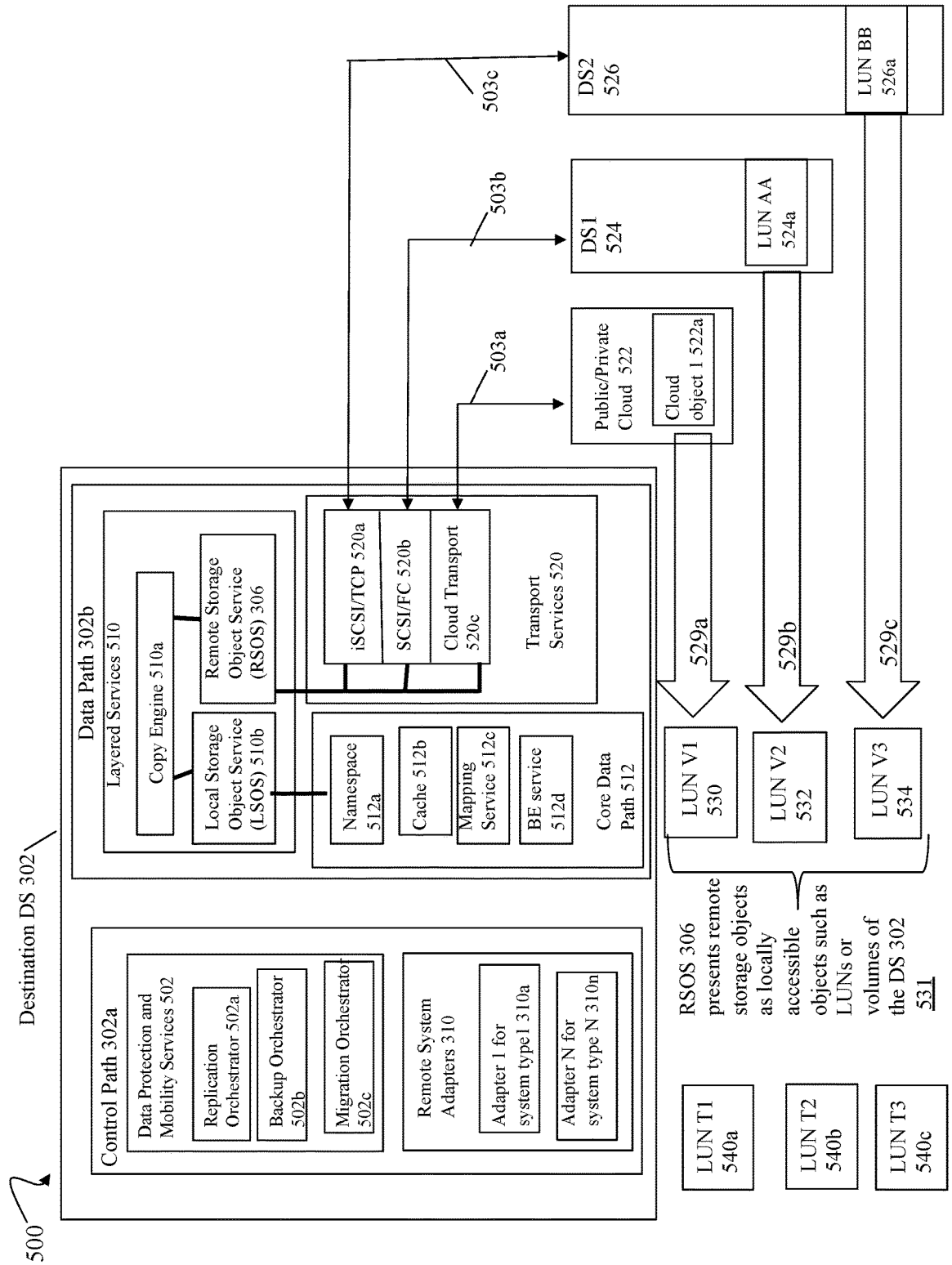

Referring to FIG. 5, shown is an example 500 illustrating in more detail components that can be included in an embodiment in accordance with the techniques herein.

In particular, the example 500 provides further details regarding components included in the destination DS 302 in at least one embodiment in accordance with the techniques of the present disclosure. The destination DS 302 of FIG. 5 includes the control path 302a, the data path 302b, and the remote system adapter(s) 310 as noted above, for example, in FIG. 3. The control path 302a of FIG. 5 includes the data protection and mobility services 502 comprising a replication orchestrator 502a that drives or controls local and/or remote data replication such as to another external system, a backup orchestrator 502b that drives or controls performing a backup of data from the system 302 to an external backup location or system, and a migration orchestrator 502b that drives or controls data migration of data from the system 302 to another external location or system. In the embodiment of FIG. 5, the remote system adapters 310 include N different remote system adapters 1 though N for N different supported or possible types of remote systems to which the destination DS 302 can connect. For example, the systems 522, 524 and 526 denote 3 different types of remote systems to which the system 302 can connect. In this case, the remote system adapters 310 include 3 different remote system adapters used to perform processing of the present disclosure when connecting, respectively, to the 3 types of remote systems 522, 524 and 526.

The data path 302b of FIG. 5 illustrates one particular architecture data path architecture for the data path 302b. Other embodiments can include other data path architectures and components than as illustrated in FIG. 5. The data path 302b of FIG. 5 includes layered services 510, a core data path 512 and transport services 520. The layered services 510 in this example 500 illustrates components used in connection with performing a copy operation between a remote storage object of a remote system, such as one of the remote systems 522, 524 and 526, and a local storage object of the destination DS 302. For example, the remote storage object can be the source of the copy operation and the local storage object can be the destination of the copy operation. In connection with performing the copy operation, the layered services 510 can include the copy engine 510a, the local storage object service (LSOS) 510b and the RSOS 306. Generally, the RSOS 306 handles processing and communication between the copy engine 510a and the transport services 520 to access the remote storage object, and the LSOS 510b handles processing and communication between the copy engine 510a and the core data path 512 to access and store data on a local storage object, where the local storage object exists or is physically located in the destination DS 302. For example, if the local storage object is a LUN, the LUN is provisioned using physical storage from BE PDs of the system 302.

In the example 500, the core data path 512 can include a namespace 512a, a cache 512b, a mapping service 512c and a backend (BE) service 512d. The namespace 512a may denote the local device or local object namespace used in the data path 302b. The cache 512b may denote a data caching layer. The mapping service 512c may denote a service that maps a local name from the namespace 512a to a corresponding BE physical storage location of a BE PD of the system 302. The BE service 512d can be used to access the BE physical storage location such as for reading data from, and writing data to, the BE physical storage location.

In at least one embodiment, the layered services 510 (e.g., more specifically the RSOS 306) may perform any needed mapping between the remote storage object of a remote system 522, 524 or 526 and its corresponding local name used by other local services in the data path 302b. The RSOS 306 can present remote storage objects as locally accessible objects within the system 302 using local names that have been previously mapped to the remote storage objects, such as in the step 422 of FIG. 4B. For example, the RSOS 306 can present a remote storage object, such as the LUN AA 524a as a local LUN of the system 302 using the local name 532. The local name 532 can be used by the copy engine controlling a copy operation, such as an offload copy operation. Assume, for example, that the remote object 524a is the source of the copy operation. The copy engine 510a can control issuing reads to read blocks of data from the remote object 524a accessed using the local name 532. Processing can be performed in the layered services 510, such as by the copy engine 510a, that determines the local name 532 is not associated with a local storage object, such as a LUN, that exists in the system 302. Put another way, the local name 532 is not mapped to a LUN having its storage provisioned locally using storage of the system 302. Rather, the layered services 510 determines that the local name 532 is mapped to, or associated with, the remote storage object 524a. In at least one embodiment, the RSOS 306 can perform processing to translate or map the local name 532 to the remote storage object 524a, and then communicate with an appropriate one of the transport services 520, such as communicate with 520b, to issue a read I/O operation to the LUN AA 524a to read data from the LUN AA 524a, and return the requested read data to the copy engine 510a. In turn, the copy engine 510a stores the read data on a destination or target, such as a second LUN 540b located locally in the system 302, wherein the LUN 540b has corresponding physical storage provisioned from BE PDs of the system 302. The destination LUN 540b can be accessed by the copy engine 510b using the LSOS 510, and other components of the core data path 512.

The transport services 520 noted above generally include services for the different supported communication protocols when communicating on the data path 302b over data path connections 503a-c to remote systems 522, 524 and 526. The transport service 520 can include support service for the iSCSI/TCP protocols 520a, the SCSI/FC 520b protocols, and a cloud transport protocol 520c. In the example 500, the cloud transport protocol service 520c is used for communicating over the connection 503a to the public or private cloud 522; the SCSI/FC service 520b is used for communicating over the connection 503b with DS1 524 denoting one type of data storage system; and the iSCSI/TCP service 520a is used for communicating over the connection 503a with the DS2 526 denote another type of data storage system.

The cloud 522 includes the remote cloud object1 522a that is mapped 529a using the techniques of the present disclosure, such as described in connection with FIGS. 4A-B, to the local device or storage object name LUN V1 530 of the system 302. The DS1 524 includes the remote storage object LUN AA 524a that is mapped 529b using the techniques of the present disclosure, such as described in connection with the FIGS. 4A-B to the local device or storage object name LUN V2 532 of the system 302. The DS1 524 includes the remote storage object LUN AA 524a that is mapped 529c using the techniques of the present disclosure, such as described in connection with FIGS. 4A-B, to the local device or local storage object name LUN V3 534 of the system 302.

In the example 500 as denoted by the element 531, the RSOS 306 presents the remote storage objects 522a, 524a and 526a, respectively, as locally accessible storage objects of the system 302, such as locally accessible devices or LUNs: LUN V1 530, LUN V2 532 and LUN V3 534. The elements 530, 532 and 534 denote local names used in the system 302 to reference, respectively, the mapped remote storage objects 522a, 524a, 526a. The local names may be used within the data path 302b. As needed, the local names are respectively mapped to their remote storage objects 522a, 524a, 526a to access the remote storage objects 522a, 524a, 526a over their respective connections 503a-c. As discussed above, the RSOS 306 can perform such mapping from local names to corresponding remote storage objects.

In the example 500, the LUNs 540a-c denote 3 LUNs of the system 302 used as target storage objects, respectively, for 3 copy operations copying data from the remote storage objects 522a, 524a and 526a. In this manner, the destination DS 302 can control or drive a copy operation between a remote storage object (e.g., such as the LUN BB 526a that is locally accessible and referenced in the system 302 using the local storage object or device name LUN V3 534) and another storage object of the system 302 (e.g., such as the target LUN T3 540c of the system 302). Generally, in connection with data pull copy operations controlled by the system 302, the system 302 can issue reads to a remote system, such as the system 526, to read data from a remote storage object, such as the remote LUN BB 526a, over an established data path connection, such as 503c, to copy the data read to a target, such as location on a target LUN T3 540c.

To further illustrate, a first copy operation can be performed by the destination DS 302 that pulls data from the remote storage object 526a as the data source that is copied to the target LUN T3 540c, where the LUN T3 540c is the destination or target storage object of the first copy operation. The copy engine 510a can control the copying of the first copy operation. For the first copy operation, the system 302 uses the local name LUN V3 534 (that is mapped to the remote storage object 526a) to reference and access the remote storage object 526a over the connection 503c, where the data is copied from the remote storage object 526a over the connection 503a and then to the following sequence of components of the system 302: the iSCSI/TCP service 520a of the transport services 520, the RSOS 306, the copy engine 510a, the LSOS 510b, and the core data path 512 to store the data in the target LUN T3 540c. With the first copy operation, the RSOS 306 may translate or map the local name 534 to its associated remote storage object 526a as may be needed so that local services, such as the layered services 510, in the system 302 use the local name 534, and so that the mapped remote storage object 526a can be accessed over the connection 503c as may be needed. For example, the system 302 may be issuing a read to read data from the LUN V3 534. The local name 534 is translated to its mapped corresponding remote storage object 526a in order to access data of the remote storage object 526a.

To further illustrate, a second copy operation can be performed by the destination DS 302 that pulls data from the remote storage object 524a as the data source that is copied to the target LUN T2 540b, where the LUN T2 540b is the destination or target storage object of the second copy operation. For the second copy operation, the system 302 uses the local name LUN V2 532 (that is mapped to the remote storage object 524a) to reference and access the remote storage object 524a over the connection 503b, where the data is copied from the remote storage object 524a over the connection 503b and then to the following sequence of components of the system 302: the SCSI/FC services 520b of the transport services 520, the RSOS 306, the copy engine 510a, the LSOS 510b, and the core data path 512 to store the data in the target LUN T2 540b. With the second copy operation, the RSOS 306 may translate or map the local device or local name 532 to its associated remote storage object 524a as may be needed so that local services in the system 302 use the local name 532, and so that the mapped remote storage object 524a can be accessed over the connection 503b as may be needed. For example, the system 302 may be issuing a read to read data from the LUN V2 532. The local name 532 is translated to its mapped corresponding remote storage object 524a in order to access data of the remote storage object 524a.

To further illustrate, a third copy operation can be performed by the destination DS 302 that pulls data from the remote storage object 522a as the data source that is copied to the target LUN T1 540a, where the LUN T1 540a is the destination or target storage object of the third copy operation. For the third copy operation, the system 302 uses the local name LUN V1 530 (that is mapped to the remote storage object 522a) to reference and access the remote storage object 522a over the connection 503a, where the data is copied from the remote storage object 522a over the connection 503a and then to the following sequence of components of the system 302: the cloud transport services 520c of the transport services 520, the RSOS 306, the copy engine 510a, the LSOS 510b, and the core data path 512 to store the data in the target LUN T1 540a. With the third copy operation, the RSOS 306 may translate or map the local device or local name 530 to its associated remote storage object 522a as may be needed so that local services in the system 302 use the local device or local name 530, and so that the mapped remote storage object 522a can be accessed over the connection 503a as may be needed. For example, the system 302 may be issuing a read to read data from the LUN V1 530. The local name 530 is translated to its mapped corresponding remote storage object 522a in order to access data of the remote storage object 522a.

Generally, the components of FIG. 5 can also be used in connection with data push copy operations controlled by the system 302, where the system 302 can issue writes that write data from a source storage object of the system 302 to a remote target storage object of one of the remote systems 522, 524, 526. For example, the system 302 can perform a data push copy operation that writes data from the LUN V3 540c to the remote storage object 526a over the established data path connection 503c, where the system 302 references the remote storage object 526a using its mapped local name LUN V3 534.

The copy operations, as either data push or data pull operations, are examples of different applications or uses of the techniques of the present disclosure performed in connection with the second phase or part of processing noted above. The copy operations can be, for example, offload copy operations that are performed in connection with any suitable use case and application of the second phase or part of processing.

Figure 6A:
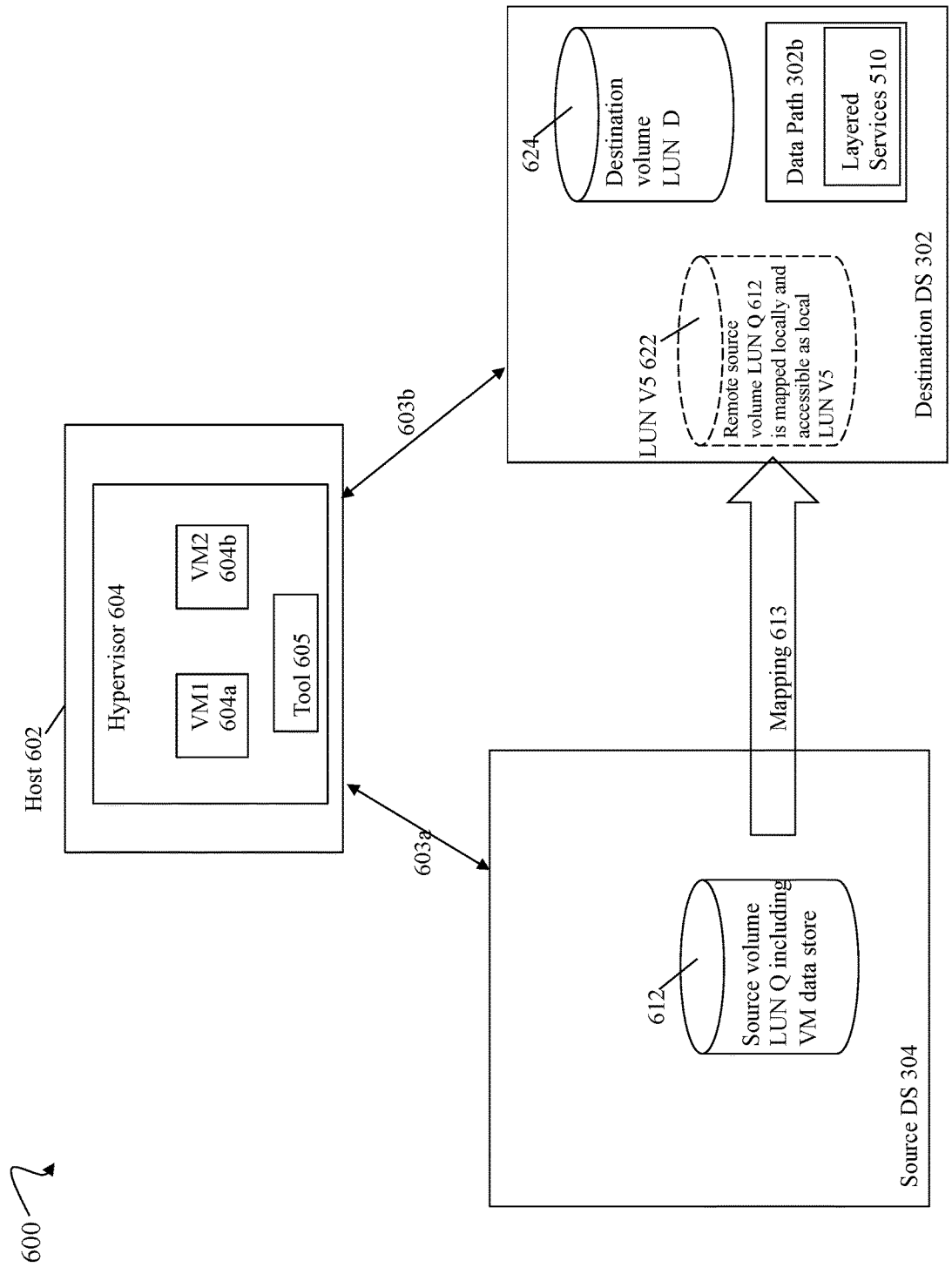

With reference to FIG. 6A, shown are components and systems that can be used in an embodiment in accordance with the techniques herein when performing a data migration between two data storage systems where the data migration can be accomplished using a data offload copy operation. The example 600 of FIG. 6A illustrates one particular use case in which an offload copy operation is utilized to migrate data used by VMs from the system 304 to the system 302.

The example 600 includes a host 602, a source DS 304 and a destination DS 302. The destination DS 302 and source DS 304 of FIG. 6A as discussed above, for example, in FIG. 3. Further, in at least one embodiment, the destination DS 302 can be as described in connection with FIG. 5 and the source DS 304 can be the system 524 or 526 of FIG. 5. The host 602 communicates with the source DS 304 over the connection 603a. The host 602 communicates with the destination DS 302 over the connection 603b.

The host 602 includes the hypervisor 604 with two VMs 604a-b executing in the context of the hypervisor 604. The hypervisor 604 generally creates and runs the VMs 604a-b. In this example, the source DS 610 includes the LUN Q 612 used as the VM data store including user data that is read and written by applications executing on the VMs 604a-b. The LUN Q 612 is exposed, visible and accessible to the hypervisor 604, its VMs 604a-b, and the host 602 over the connection 603a.

It may be desirable to migrate the LUN Q 612 used as the VM data store for the hypervisor 604 from the source DS 304 to the destination or target LUN D 624 in the destination DS 302. The migration can be performed for any reason such as, for example, in connection with load balancing between the systems 302 and 304. In this example, the LUN Q 612 is the source volume of the migration and the LUN D 624 is the destination of the migration. The destination LUN D 624 is also exposed, visible and accessible to the hypervisor 604, its VMs 604a-b, and the host 602 over the connection 603b. The destination DS 302 performs processing to control the migration by performing a data pull that copies data from the remote source volume 612 to the destination volume 624 in a manner consistent with discussion above (e.g., in connection with FIGS. 3, 4A-4B, and 5).

The techniques described herein in the first phase or part (e.g., FIGS. 4A-4B) can be used to pair the systems 302 and 304 as in the part or phase 1A, and can be used to enable or map the remote storage volume LUN Q 612 into the I/O stack of the data path or I/O path of the destination DS 302, where the layered services 510 of the data path 302b of the destination DS 302 present the remote volume 612 as the locally accessible volume or LUN V5 622 in the system 302. As noted above, the system 302 can include components such as the layered services 510 of the data path 302b as illustrated in the system 302 of FIG. 5, where all the components of the system 302 are not explicitly illustrated in FIG. 6A for simplicity. In at least one embodiment, the remote storage volume LUN Q 612 can be mapped to a local name 622 in the system 302 denoting a local device or local storage object of the system 302. The layered services 510 in the data path 302b of the system 302 can use the local name 622 as a proxy to reference the remote source volume 612 and perform the required reads to read data from the remote source volume 612, and then write the read data to the destination volume 624.

In this example, both LUNs or volumes 612 and 624 are exposed to the host 602, respectively, over the connections or paths 603a-b. In this manner, the host can directly issue read and write commands to both the source volume 612 and the destination volume 624. However, the local name, LUN V5 622, is not directly exposed or visible to the host. As denoted by the dashed outline, the element 622 denotes a local name, such as a local storage object name, local volume name or local device name, that is mapped to the remote source volume 612 in the first phase or part of processing described in the present disclosure.

In this example, a tool executing on the host 602 can be used to migrate the source volume 612 to the destination volume 624, where the source volume 612 is a VM data store as noted above. Once the first phase or part of processing has been successfully completed with respect to the systems 302 and 304, the second part or phase of processing can be performed. In this example, the second part or phase can include the tool 605 issuing an offload copy command, such as an XCOPY command, to perform the desired migration of data from the source volume 612 to the destination volume 624. The XCOPY command in this example identifies the source volume LUN 612 as the source of the offload copy operation, and identifies the destination volume 624 as the destination or target of the offload copy operation Once the remote source system LUN 612 is available and accessible as a local LUN 622 of the destination DS 302 (e.g., as a result of performing the processing of FIGS. 4A and 4B), the remote source system LUN 612 may be accessed on the destination DS 302 as a local LUN in connection with any suitable use case or application. In this example, the host 602 issues the XCOPY command over the connection 603b to the destination DS 302. The XCOPY command identifies the remote volume LUN Q 612 as the source of the offload copy operation, and identifies the destination volume LUN D 624 as the destination of the offload copy operation. The remote volume 612 is mapped to its corresponding local name LUN V5 622 within the data path of the system 302 when using local services, such as layered services 510. As needed to read data, the local name LUN V5 622 is also translated to its corresponding mapped remote volume LUN Q 612 to access and read data from the mapped remote volume LUN Q 612.

In the example of FIG. 6A, the remote storage object 612 is a LUN including the VM data store of user data of the VMs 604a-b. More generally, the remote storage object that is migrated can be used in connection with also migrating the VMs and associated VM state information between systems and is not limited to migrating VM data stores containing user data of the applications executing in the VMs 604a-b.

Referring to FIG. 6B, shown is an example 700 of tables of information that can be used in an embodiment in accordance with the techniques herein. The example 700 includes the logical device or LUN table 702 and the remote storage object mapping table 710. The tables of FIG. 6B can be used, for example, by components of the destination DS 302 in connection with performing processing of techniques of the present disclosure.

The table 702 can include information regarding LUNs that are configured and provisioned locally in the destination DS 302 thereby having backing physical storage from BE PDs of the system 302. The table 702 can be included in the data storage system configuration information describing logical entities, such as LUNs, configured in the current configuration of the system 302. The table 702 includes a column 702a denoting a volume or LUN ID 702a and a second column 702b including LUN information. The column 702b may generally denote any suitable information stored and used in connection with local LUNs existing in the system 302. Each row of the table 702 may correspond to a different existing LUN on the system 302. For example the row 704a indicates that the LUN H1 (column 702a) has associated information 1 (column 702b), and the row 704b indicates that the LUN H2 (column 702a) has associated information 2 (column 702b). The information in the column 702b for each LUN having an associated entry in the table 702 may include, for example, properties or attributes of a configured and provisioned LUN. For example, the information in the column 702b for each LUN having an entry in the table 702 can include the configured LUN's total storage capacity, the configured LUN's unused storage capacity, the associated RAID group from which physical storage is provisioned for the LUN, a local name of the LUN within the destination DS 302, and the like. The local name for the LUN may be used, for example, by layered services 510 of the data path 302b of the system 302 when performing processing such as to access data from the associated locally configured LUN having the entry in the table 702.

The table 710 can information used in connection with remote storage objects mapped to local names as a result of performing the first part of phase of processing such as discussed above in connection with the FIGS. 4A-4B. The table 710 includes a column 710 denoting a remote storage object identifier (ID) 710, a column 710b denoting a local name and a column 710c including remote storage object information. Each entry of the table 710 may correspond to a different remote storage object that is mapped to a corresponding local name in the system 302, where the local name is used as a proxy within the system 302 to reference an associated remote storage object in connection with accessing the associated remote storage object, for example, to read data from and/or write data to the associated remote storage object in accordance with the techniques described herein. The entry 712 indicates that the remote storage object ID LUN Q(710a) of the system 304 has an associated local name LUN V5 (710b) and associated remote storage object information 1 (710c). The entry 714 indicates that the remote storage object ID LUN AA (710a) of the system 304 has an associated local name LUN V2 (710b) and associated remote storage object information 2 (710c). The entry 716 indicates that the remote storage object ID LUN BB (710a) of the system 304 has an associated local name LUN V3 (710b) and associated remote storage object information 3 (710c).

The remote storage object information 710c for each of the mapped remote storage objects may include information obtained as a result of discovery processing performed in the first phase or part, such as in the step 420 of FIG. 4B. For example, the information 710c for the remote storage object LUN Q of the row 712 can include the one or more I-T nexuses or connections over which the remote LUN Q is exposed to the destination DS 302, where the one or more connections are data path connections between the systems 302 and 304 as discovered as a result of the system 302 performing discovery processing in the step 420 of FIG. 4B. The information 710c for the remote storage object LUN Q of the row 712 can include, for example, the protocol (e.g., SCSI, NVMe) used for communications between the source DS 304 and the destination DS 302. The information 710c for the remote storage object LUN Q of the row 712 may also vary with the particular protocol used for communications between the systems 302 and 304. For example, the information 710c of the entry 712 can include another device ID or storage object identifier used in I/O operations to reference the remote storage object LUN Q over a data path or I-T connection. If the systems 302 and 304 communicate using the SCSI protocol and the IDs 710a are WWNs, information 710c of the entry 712 can include the logical unit number of the remote LUN Q as presented over each of the one or more I-T nexuses or connections to the destination DS 302, where the logical unit number is discovered as a result of the system 302 performing discovery processing in the step 420 of FIG. 4B. The logical unit number of the remote LUN Q 612 can be used, for example, in command data blocks (CDBs) for I/Os issued from the system 302 to the system 304 over the discovered I-T nexuses, where the I/Os can include read I/Os to read data from the source volume LUN 612, and where the read data is then written to the destination volume LUN D 624. If the systems 302 and 304 communicate using the NVMe protocol and the IDs 710a are NGUIDs, information 710c of the entry 712 can include the namespace identifier (NSID) of the remote LUN Q as presented over the one or more I-T nexuses or connections to the destination DS 302, where the NSID is discovered as a result of the system 302 performing discovery processing in the step 420 of FIG. 4B. The NSID of the remote LUN Q 612 can be used, for example, in I/Os issued from the system 302 to the system 304 over the discovered I-T or data path connections, where the I/Os can include read I/Os to read data from the source volume LUN 612, and where the read data is then written to the destination volume LUN D 624.

Depending on the protocol, the remote storage object identifiers 710a and the volume or LUN IDs 702a, I/O operations such as a read command data block (CDB) of a read I/O operation to data from the remote storage object can specify the remote storage object identifier. As a variation as described above, the mapped remote storage object identifier can be further associated with other information, such as a logical unit number, NSID, or other identifier, included in read CDB or more generally read I/O. In this manner, an existing operation or service can reference the local name as a proxy for its mapped remote storage object, where the translation to, and use of, the mapped remote storage object can be automatically performed when servicing the offload copy operation. Generally, the local name is used as a proxy for the remote storage object where the local name is translated, or mapped to, another identifier used in I/O operations such as the above-noted read I/O operation when servicing the offload copy operation.

In at least one embodiment, the volume or LUN IDs 702a and the remote storage object IDs 710a can be protocol level identifiers used to uniquely identify LUNs, volumes or logical devices, or more generally storage objects. Thus, the volume or LUN IDs 702a and the remote storage object IDs 710a can vary with the protocol(s) used for communication between the systems 302 and 304. Generally, the remote storage objects identified using the remote storage object IDs in the column 710a can be included in one or more source systems to which the destination DS 302 is connected and configured using the first phase or part of processing as described in FIGS. 4A-4B. Thus, the particular protocol can also vary with the remote storage object. To further illustrate and for simplicity, assume that the remote storage objects associated with the rows 712, 714 and 716 are all located in the system 304 where the systems 302 and 304 communicate using the SCSI protocol. In this case, the volume or LUN ID 702a and the remote storage object IDs 710a can be WWNs, where CDBs for I/Os such as read I/Os can include a logical unit number identifying the remote storage object to be accessed on an established I-T connection or data path. As another example, assume that the remote storage objects associated with the rows 712, 714 and 716 are all located in the system 304 where the systems 302 and 304 communicate using the NVMe protocol. In this case, the volume or LUN ID 702a and the remote storage object IDs 710a can be NGUIDs, CDBs for I/Os such as read I/Os can include a NSID identifying the remote storage object to be accessed on an established I-T connection or data path.

In at least one embodiment, the protocol level identifier of a storage object, such as a LUN, can be specified in the offload copy command such as described elsewhere herein in connection with the source and/or destination of the command. For example, with reference back to the FIG. 6A and assuming the systems 302 and 304 communicate using the SCSI protocol, the offload copy command can indicate that the source of the offload copy operation is a first WWN=WWN1 for the source volume LUN Q 612 and can indicate that the destination of the offload copy operation is a second WWN=WWN2 for the destination volume LUN D 624. For example, with reference back to the FIG. 6A and assuming the systems 302 and 304 communicate using the NVMe protocol, the offload copy command can indicate that the source of the offload copy operation is a first NGUID=NGUID1 for the source volume LUN Q 612 and can indicate that the destination of the offload copy operation is a second NGUID=NGUID2 for the destination volume LUN D 624.

Although the tables of FIG. 6B are illustrated with respect to a storage objects that are LUNs, volumes or logical devices, the tables are more generally applicable for use with any suitable storage object.

Figure 6C:
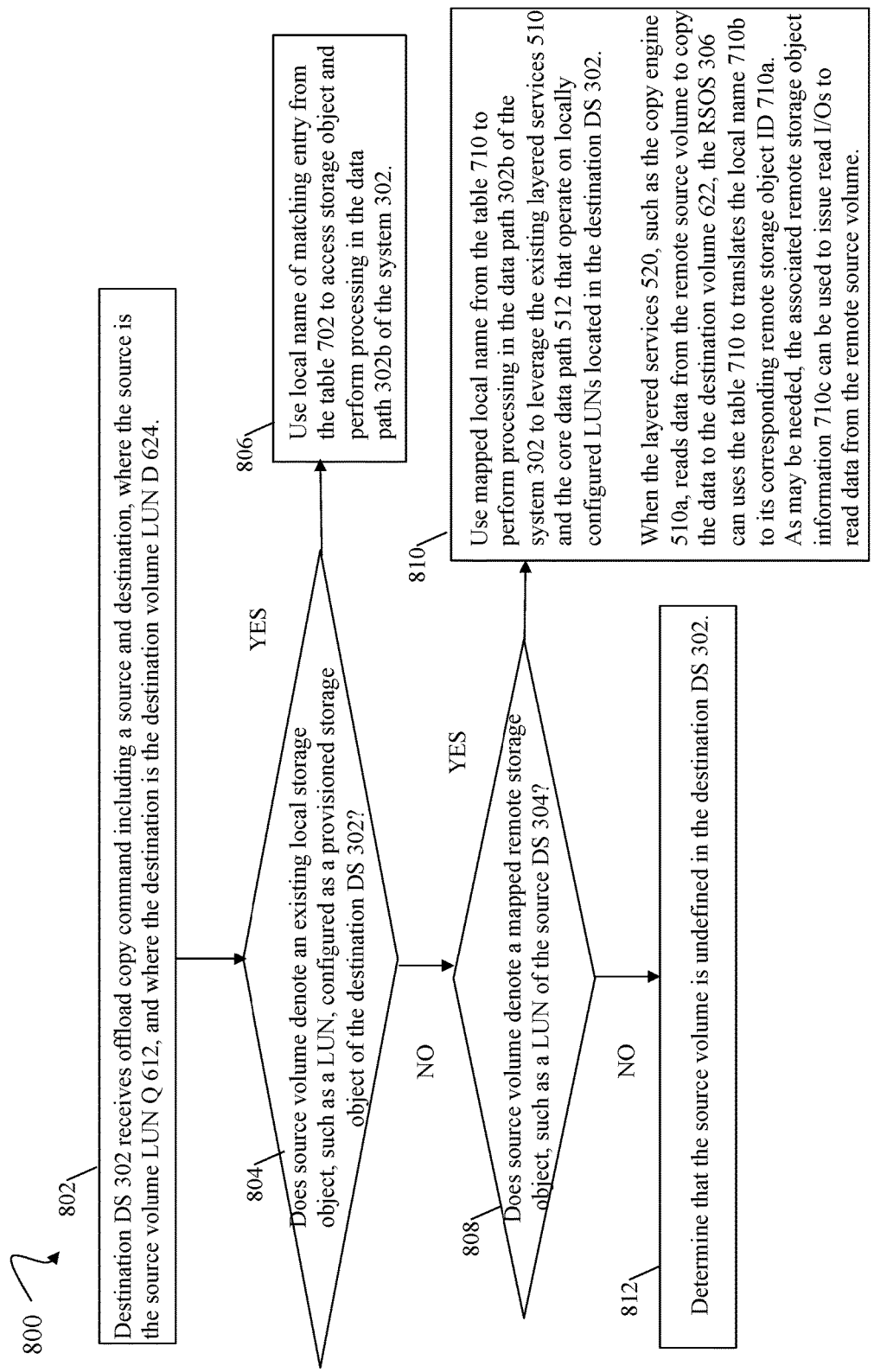

Referring to FIG. 6C, shown is a flowchart 800 of processing steps that may be performed in an embodiment in accordance with the techniques herein. The processing steps of FIG. 6C describe how the tables 702 and 710 of FIG. 6B can be used in connection with processing an offload copy operation received by the destination DS 302 as described in connection with the FIG. 6A.

At the step 802, the destination DS 302 receives, from the host 602, the offload copy command specifying a source and a destination, where the source is the source volume LUN Q 612, and where the destination is the destination volume LUN D 624. The offload copy command may identify the source volume using a first volume or LUN ID uniquely identifying the LUN Q 612, and may identify the destination volume using a second different volume or LUN ID uniquely identifying the LUN D 624. Assume for purposes of illustration the offload copy operation identifies the source volume 612 by a first protocol level identifier such as the WWN1 as discussed above and identifies the destination volume 624 by a second protocol level identifier such as the WWN2 as discussed above. From the step 802 control proceeds to the step 804. The steps 804, 806, 808 and 812 can be performed by the destination DS 302 controlling the offload copy operation processing.

At the step 804, a determination is made as to whether the source volume of the offload copy command denotes an existing local storage object, such as a LUN, configured as a provisioned storage object of the destination DS 302. The step 804 can be performed using the table 702 and comparing the source volume's protocol level identifier, WWN1, to the volume or LUN IDs 702a in the table 702 to determine whether there is an existing entry in which the existing volume or LUN ID 702a matches the source volume's protocol level identifier. The step 804 evaluates to yes if such a matching entry in the table 702 is located, otherwise the step 804 evaluates to no. If the step 804 evaluates to yes, control proceeds to the step 806.

At the step 806, the destination DS 302 uses the local name from the matching entry of the table 702 to access the local storage object as the source of the offload copy operation and perform processing in the data path 302b of the system 302. Consistent with discussion above in connection with FIG. 6B, the LUN information 702b of the matching entry determined in the step 804 can include the local name associated with the source volume identified using the protocol level identifier WWN1. The local name, such as a local name 1, associated with WWN1 can be used locally in the data path 302b, such as by the LSOS 510b and namespace 512a, to reference the source volume.

If the step 804 evaluates to no, control proceeds to the step 808. At the step 808, a determination is made as to whether the source volume denotes a mapped remote storage object, such as a LUN of the source DS 304. The step 808 can be performed using the table 710 and comparing the source volume's protocol level identifier, WWN1, to the remote storage object IDs 710a in the table 710 to determine whether there is an existing entry in which the existing remote storage object ID 710a matches the source volume's protocol level identifier. The step 808 evaluates to yes if such a matching entry in the table 710 is located, otherwise the step 808 evaluates to no. If the step 808 evaluates to yes, control proceeds to the step 810.

At the step 810, the mapped local name 710b of the matching entry of the table 710 determined in the step 808 can be used to perform processing in the data path 302b of the system 302 to leverage the existing layered services 510 and the core data path 512 that operate on locally configured LUNs located in the destination DS 302. For example, for the source volume LUN Q 612, the remote storage object ID="LUN Q" matches the entry 712 where the local name "LUN V5" can be used in the data path 302b to perform processing. For example, when the layered services 520, such as the copy engine 510a, reads data from the remote source volume 612 to copy the data to the destination volume 622, the RSOS 306 can use the entry 712 of the table 710 to translate the local name 710b, which is "LUN V5" to its corresponding remote storage object ID 710a, which is "LUN Q". As may be needed, the associated remote storage object information 710c of the matching entry 712 can be used to issue read I/Os to read data from the remote source volume having the remote storage object ID "LUN Q". For example when the SCSI protocol is used for communication between the systems 302 and 304, the information 710c of the entry 712 may identify an I-T connection and an associated logical unit number used in CDBs of read I/Os issued over the I-T connection to service the offload copy operation. In accordance with the SCSI protocol, the CDBs of the read I/Os include the associated logical unit number identifying the remote source volume 612 to which the read I/Os are directed. For example when the NVMe protocol is used for communication between the systems 302 and 304, the information 710c of the entry 712 may identify an I-T connection and an associated NSID used read I/Os issued over the I-T connection to service the offload copy operation. In accordance with the NVMe protocol, the read I/Os include the associated NSID identifying the remote source volume 612 to which the read I/Os are directed.

If the step 808 evaluates to no, control proceeds to the step 812. At the step 812, a determination is made that the source volume is undefined in the destination DS 302 whereby the destination DS 302 is unable to service the offload copy command and offload copy command then fails.

In the particular example of FIG. 6A, the processing of FIG. 6C results in execution of the steps 802, 804, 808 and 810. However, the FIG. 6C denotes the general evaluation performed and possible outcomes at each decision step 804 and 808. It should also be noted that the general processing described above in connection with the steps of FIG. 6C can be performed with respect to each volume or LUN, or more generally storage object, included in the source and destination of the offload copy command.

Figure 7A:
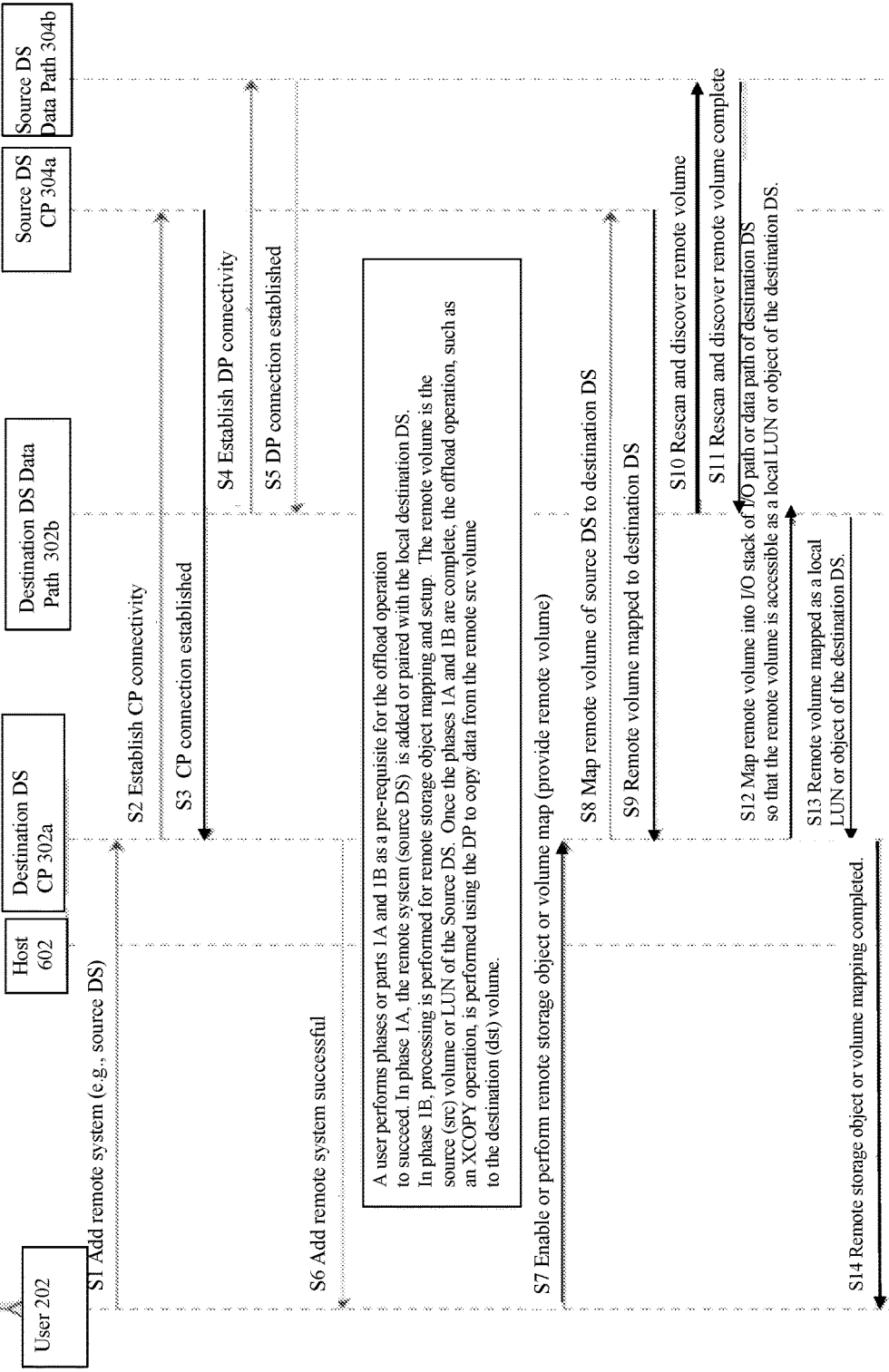
FIGS. 7A, 7B and 7C are sequence diagrams illustrating processing performed in at least one embodiment in accordance with the techniques described herein.
Figure 7B:
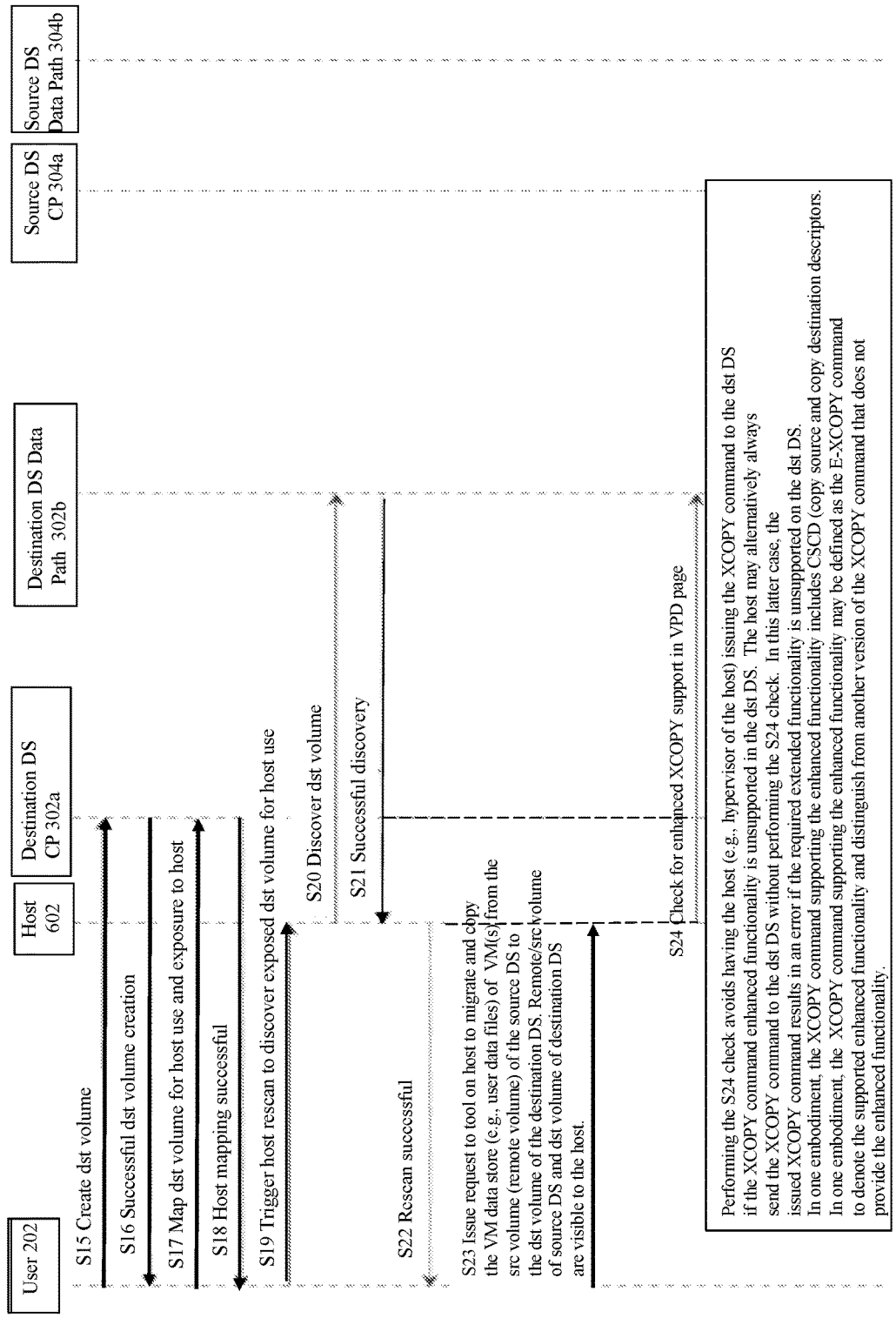
Figure 7C:
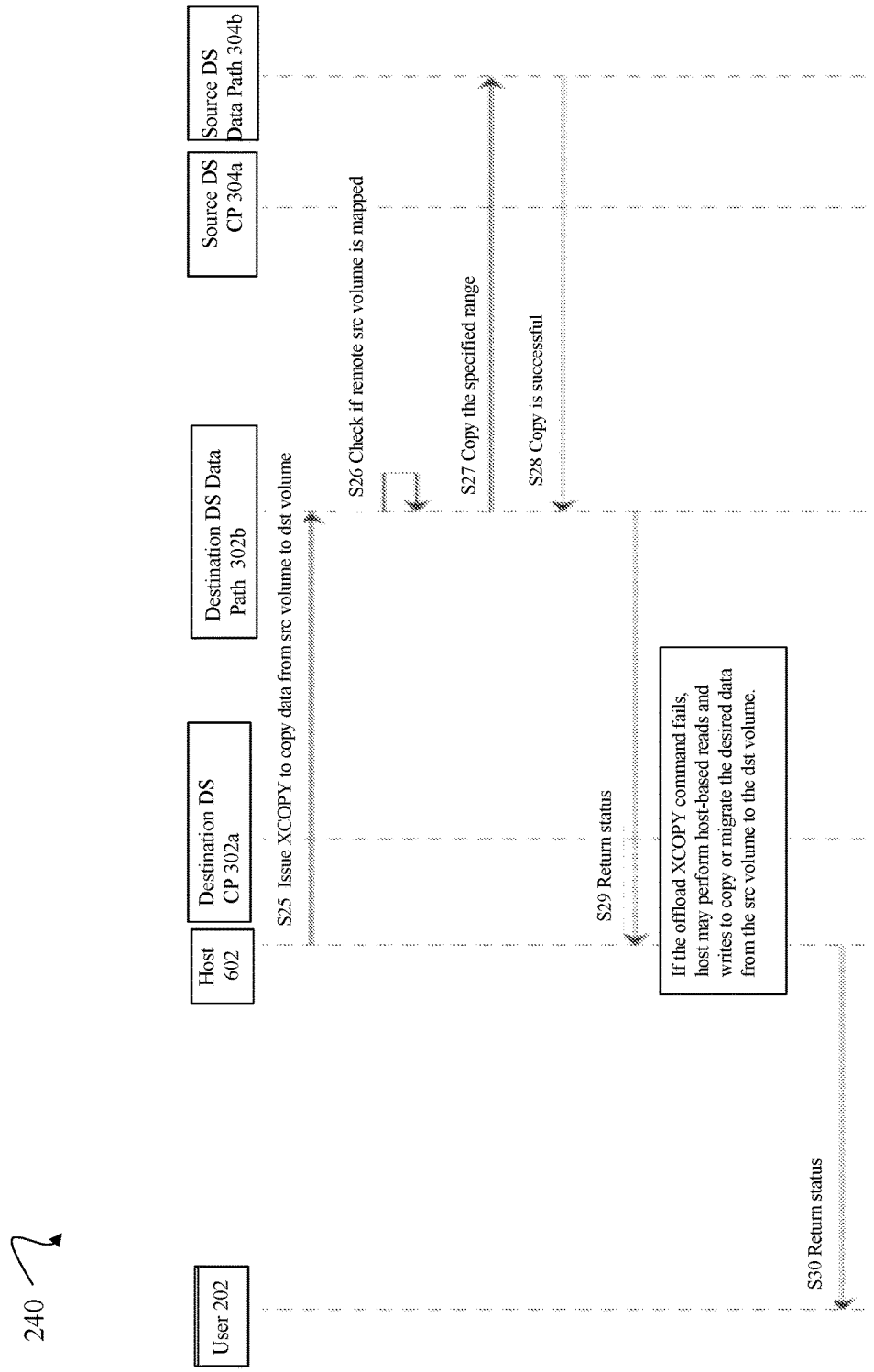

Referring to FIGS. 7A-7C, shown are sequence diagrams describing in more detail processing that can be performed by the components of FIG. 6A in connection with performing the migration of data from the source volume 612 to the destination volume 624 discussed above.

The steps S1-S6 of FIG. 7A are included, for example in the first phase or part 1A described above. The step S7-S14 of FIG. 7A are included, for example, in the first phase or part 1B described above. The steps S1-S14 illustrate processing as described above in the flowcharts of FIGS. 4A-4B for the first phase or part described above. The steps S15-S30 of FIGS. 7B-7C illustrate processing for the second phase or part of one particular application or usage scenario such as described above in connection with FIG. 6A.

In the step S1, the user 202 performs processing to request adding the source DS 304 as a remote system connected to the destination DS 302. As discussed above in at least one embodiment, the user 202 can trigger performing the first part or phase 1A of processing of the techniques herein such as by issuing the request or command from a management application to add the source DS 304 as a remote system connected to the destination DS 302. The command in the step S1 is issued to the CP 302a destination system 302. In response, the step S2 is performed to establish CP connectivity between the CP 302a of the destination DS 302 and the CP 304a of the source DS 304. Once the CP connectivity is established, control returns in the step S3 to the destination DS. Following the step S3, the step S4 is performed to establish data path (DP) connectivity with the source DS data path 304b. In the step S5, control returns to the destination DS data path 302b once the DP connection(s) are established. Responsive to establishing the DP connection in the step S5, the destination DS 302 indicates to the user 202 that the remote system, the source DS, has been successfully added and connected to the destination DS 302.

In the step S7, the user 202 issue a request or command to perform a remote storage object mapping, where the user 202 can select a particular storage object, such as particular remote volume or LUN of the source DS 304, to be mapped to a local name in the destination DS 302. The user 202 can trigger performing the first part or phase 1B of processing of the techniques herein such as by issuing the request or command in the step S7 from a management application. The command in the step S7 is issued to the CP 302a of the destination system 302. In response, the step S8 is performed where the CP 302a communicates with the CP 302b to map the specified remote volume of the source DS 304 for use by the destination DS 302. Once the remote volume of the source DS 304 is mapped to the destination DS 302 for use by the destination DS 302, control returns in the step S9 to the CP 302a of the destination DS 302.

In the step S10, the destination DS data path 302b performs processing to rescan and discover the remote volume exposed to the destination DS 302 over one or more I-T nexuses or DP connections where the system 302 acts as the initiator and the system 304 acts as the target of such DP connections. In the step S11, the rescan and discovery of the remote volume of the source DS is complete and control returns to the destination DS data path 302b.

In the step S12, the CP 302a of the destination DS communicates with the destination DS data path 302b to map the remote volume of the source DS 302 into the I/O stack of the I/O path or data path 302b of the destination DS so that the remote volume is accessible as a local LUN or object of the destination DS. In the step S13, after the remote volume has been mapped as a local LUN or object of the destination DS, control returns from the destination DS data path 302b to the CP 302a of the destination DS 302. In the step S14, the CP 302a of the destination DS returns a message to the user indicating that the remote storage object or volume mapping for the selected remote volume is complete.

In the step S15, the user 202 creates the destination or dst volume, which is the destination volume 624 of FIG. 6A. The step S15 may include the user 202 issuing commands or requests from the management application to the CP 302a of the destination DS 302 to locally provision and configure the destination volume 624 within the destination DS 302. Once the dst volume is created, the step S16 returns a successful completion message to the user 202. In the step S17, the user 202 issues one or more commands, such as from the management application to the CP 302a of the destination DS 302, to expose the dst volume to the host 602. Once the dst volume is successfully exposed to the host over one or more paths from the host 602 to the destination DS 302, a message regarding success is returned in the step S18 to the user.

In the step S19, the user 202 can issue a request or command to the host 602 to trigger rescanning by the host to discover the dst volume exposed to the host in the step S17. In the step S20, the host issues one or more commands to the destination DS data path 302b to discover the dst volume. After successful discovery, control returns in S21 to the host 602, and the also returns to the user 202 in the step S22. In the step S22, the user 202 can be provided with a message indicating successful completion of the rescan and discovery of the dst volume created and exposed to the host in the steps S15 and S16, respectively.

In the step S23, the user 202 issues a request or command to the tool 605 on the host to copy the VM data storage containing user data files used by the VMs from the remote source volume 612 of the source DS to the destination volume 624 of the destination DS 302. The volumes 612 and 624 are both visible, exposed and accessible to the host 602.

In the step S24, the tool 605 of the host performs the step S24 to check whether the destination DS data path 302b includes support for an enhanced version or enhanced functionality of the XCOPY command. The step S24 may include the tool 605 of the host issuing one or more commands that can vary with the communication protocol used for communication between the host and the destination DS 302. For example, if the host 602 and the destination DS 302 communicate using the SCSI protocol, the host can issue a SCSI INQUIRY command to fetch vital page data (VPD) describing the capabilities and supported services or commands of the destination DS 302. The response returned by the destination DS to the host for the one or more commands, such as in response to the foregoing SCSI inquiry command, can include information identifying whether or not the destination DS supports the enhanced version or functionality of the XCOPY as described in connection with FIG. 6A, where the source and/or destination can identify one or more mapped remote volumes of other systems such as the source DS 304.

Performing the S24 check avoids having the host (e.g., hypervisor of the host) issuing the XCOPY command to the destination DS if the XCOPY command enhanced functionality is unsupported in the destination DS. The host may alternatively always send the XCOPY command to the destination DS without performing the S24 check. In this latter case, the issued XCOPY command results in an error if the required extended functionality is unsupported on the destination DS. In one embodiment, the XCOPY command supporting the enhanced functionality includes CSCD (copy source and copy destination descriptors). Such descriptors provide for specifying LBA ranges of particular LUNs or volumes specified as the source and destination of the XCOPY command. In one embodiment, the XCOPY command supporting the enhanced functionality may be defined as the E-XCOPY command to denote the supported enhanced functionality and distinguish from another version of the XCOPY command that does not provide the enhanced functionality.

In this example, assume that the step S24 check indicates that the destination DS 302 supports the enhanced version or functionality of the XCOPY command allowing for mapped remote volumes. In the step S25, the host 602 issues an XCOPY command to the destination DS data path 302b to copy data from the remote source volume 612 to the destination volume 624. At the step S26, the data path 302b of the destination DS 302 checks that the remote source volume 612 is mapped to a local name in the destination DS data path 302b. As noted above such as in connection with the SCSI standard, the remote source volume can be identified in the XCOPY command using a protocol level identifier such as WWN1, and the destination volume 624 can be identified using a protocol level identifier such as WWN2. The step S26 can include, for example, checking the table 710 of FIG. 6B to ensure that the WWN1 for the remote source volume has a matching entry in the table 710, where the protocol level identifier of the remote source volume matches a remote storage object ID 710a of an entry in the table 710.

In this example, assume that the step S26 is successful. In this case, the step S27 is performed to copy a specified source range, such as an LBA range, of the remote source volume 612 to the destination volume 624. In at least one embodiment, the source range of data can be copied to a specified destination offset or target LBA range of the destination volume 624. In the step S27, one or more read commands are issued from the data path 302b of the destination DS to the data path 304b of the source system. The read commands can be directed to the remote source volume 612 associated with the particular identifier, such as WWN1, specified in the XCOPY command. The read data can be returned in a response in the step S28. In the step S29, the data path 302b of the destination DS returns a status regarding completion of the XCOPY command issued in the prior step S25. In the step S26, the host 602 then returns a further status regarding completion of the requested data migration or copy (issued in the step S23) to the user 202.

In at least one embodiment, if the XCOPY command issued in the step S25 fails, the host may perform host-based reads and writes to copy or migrate the desired data from the remote source volume 612 to the destination volume 624.

The techniques of the present disclosure can be used in any suitable use case or application. For example, the processing described above (e.g., in connection with FIGS. 6A, 7A and 7B) migrates a VM data store containing user data used by applications executing in the VMs of the host 602. As a variation, assume that the VMs are executing on the source DS 304 to that the VMs themselves as well as the VM data store are located in the source DS 304. The offload copy operation, such as the XCOPY command supporting mapped remote volumes, can also be used to migrate the VMs as well as the VM data store from the source DS 304 to the destination DS 302.

As another use case, the remote source volumes of the XCOPY or other offload copy operation can be snapshots of the source DS 304 that are copied to corresponding destination volumes of the destination DS 302, where the destination volumes of the destination DS 302 can be made available and exposed to external clients such as the host 602.

As another use case, the remote source volumes of the XCOPY or other offload copy operation can be backup data sets or volumes of a backup appliance or system (functioning as the source system 304), where the remote source volumes are copied to corresponding destination volumes of the destination DS 302. The destination volumes of the destination DS 302 can be made available and exposed to external clients such as the host 602.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   establishing a control path session over a control path connection between a first system and a second system;
   establishing one or more data path connections between the first system and the second system;
   selecting, over the control path session, a remote storage object of the second system;
   exposing, over a first target of the second system, the remote storage object of the second system to a first initiator of the first system, wherein the remote storage object is exposed over a first of the one or more data path connections between the first system and the second system and wherein the first data path connection is between the first initiator and the first target;
   mapping the remote storage object of the second system to a first local storage object name in the first system, and wherein, as a result of said mapping, the first local storage object name is used in the first system as a proxy to access the remote storage object of the second system as a first local storage object of the first system; and
   performing first processing on the first system to service a copy operation that copies data between the remote storage object of the second system and a second storage object of the first system, wherein the first processing includes:
      creating a first I/O operation in connection with servicing the copy operation, wherein said creating includes translating the first local storage object name associated with the remote storage object to a remote storage object identifier associated with the remote storage object; and
      issuing the first I/O operation, that is directed to the remote storage object, over the first data path connection from the first system to the second system, and wherein the method further comprises:
   selecting a first remote system adapter from a plurality of remote system adapters, wherein each of the plurality of remote system adapters corresponds to a different supported remote system type to which the first system is allowed to connect, wherein the first remote system adapter corresponds to a first supported system type, and wherein the second system is the first supported system type.

2. The computer-implemented method of claim 1, wherein the first remote system adapter performs first processing including: said establishing the control path session, said establishing said one or more data path connections between the first system and the second system, selecting said remote storage object of the second system, and said exposing the remote storage object of the second system to the first initiator of the first system.

3. The computer-implemented method of claim 1, wherein the first system and the second system communicate over the one or more data path connections using a first protocol, and wherein the first processing performed by the first remote system adapter includes customized processing in accordance with the first protocol.

4. The computer-implemented method of claim 2, wherein said first processing includes creating an access control structure used by the second system to allow the first system to access the remote storage object of the second system, wherein the access control structure allows the remote storage object of the second system to be accessible to first initiator of the first system over the first target of the second system.

5. The computer-implemented method of claim 4, wherein said access control structure is used in said exposing the remote storage object of the second system to the first initiator of the first system.

6. The computer-implemented method of claim 5, further comprising:
   testing the access control structure.

7. The computer-implemented method of claim 5, further comprising:
   discovering, by the first system and in accordance with the access control structure, one or more remote storage objects of the second system that are accessible to the first system over the one or more data path connections, wherein said plurality of remote storage objects includes the remote storage object.

8. The computer-implemented method of claim 1, wherein the copy operation is an offload copy operation that copies data between the remote storage object of the second system and the second storage object of the first system.

9. The computer-implemented method of claim 1, wherein the copy operation copies data from the remote storage object of the second system to the second storage object of the first system, and wherein the first I/O operation is a read operation that reads first data from the remote storage object, and wherein the computer-implemented method further includes:
   returning the first data from the second system to the first system; and
   responsive to receiving the first data at the first system, writing the first data to the second storage object.

10. The computer-implemented method of claim 1, wherein the copy operation copies data from the second storage object of the first system to the remote storage object of the second system, and wherein the first I/O operation is a write operation that writes first data of the second storage object to the remote storage object, and wherein the computer-implemented method further includes:
- sending the first data of the write operation from the first system to the second system; and
- responsive to receiving the first data at the second system, writing the first data to the remote storage object.

11. The computer-implemented method of claim 1, wherein the second storage object is a logical device and wherein the remote storage object is a logical device.

12. The computer-implemented method of claim 1, wherein the second storage object is a logical device and wherein the remote storage object is a snapshot of a logical device.

13. The computer-implemented method of claim 1, wherein the second storage object is a logical device, wherein the second system is included in a data storage cloud, and wherein the remote storage object is a cloud storage object of the data storage cloud.

14. The computer-implemented method of claim 1, wherein the second storage object is a logical device, wherein the second system is a backup system, and wherein the remote storage object is a backup storage object having a customized format in accordance with the backup system.

15. The computer-implemented method of claim 1, wherein the second storage object is a logical device, wherein the second system is a data archive system, and wherein the remote storage object is a data archive storage object having a customized format in accordance with the data archive system.

16. A computer-implemented method comprising:
- establishing a control path session over a control path connection between a first system and a second system;
- establishing one or more data path connections between the first system and the second system;
- selecting, over the control path session, a remote storage object of the second system;
- exposing, over a first target of the second system, the remote storage object of the second system to a first initiator of the first system, wherein the remote storage object is exposed over a first of the one or more data path connections between the first system and the second system and wherein the first data path connection is between the first initiator and the first target;
- mapping the remote storage object of the second system to a first local storage object name in the first system, and wherein, as a result of said mapping, the first local storage object name is used in the first system as a proxy to access the remote storage object of the second system as a first local storage object of the first system; and
- performing first processing on the first system to service a copy operation that copies data between the remote storage object of the second system and a second storage object of the first system, wherein the first processing includes:
  - creating a first I/O operation in connection with servicing the copy operation, wherein said creating includes translating the first local storage object name associated with the remote storage object to a remote storage object identifier associated with the remote storage object; and
  - issuing the first I/O operation, that is directed to the remote storage object, over the first data path connection from the first system to the second system, and wherein the method further includes:
- receiving the copy operation at the first system, wherein the copy operation includes the remote storage object identifier denoting the remote storage object, wherein the copy operation includes a second storage object identifier denoting the second storage object, wherein the copy operation identifies one of the remote storage object and the second storage object as a source of the copy operation and identifies another of the remote storage object and the second storage object as a destination of the copy operation, wherein a first table of the first system includes local storage object information describing local storage objects configured in the first system, and wherein a second table of the first system includes information about remote storage objects discovered by the first system; and
- responsive to receiving the copy operation at the first system, performing third processing including:
  - determining, by the first system using the first table, that the remote storage object identifier does not match any local storage object identifier in the first table;
  - responsive to determining that the remote storage object identifier does not match any local storage identifier of the first table, determining by the first system that the remote storage object identifier does not identify a local storage object of the first system;
  - determining, by the first system, that the remote storage object identifier matches an existing remote storage object identifier included in an entry of the second table, wherein the entry indicates that the existing remote storage object identifier of the entry is mapped to the first local storage object name; and
  - responsive to determining the remote storage object identifier matches the existing remote storage object identifier of the entry of the second table, determining that the remote storage object identifier is mapped to the first local storage object name which is used a proxy to access the remote storage object of the second system as the first local storage object of the first system.

17. The computer-implemented method of claim 16, wherein the first system and the second system communicate over the first data path connection using a particular protocol, wherein the entry of the second table including the existing remote storage object identifier is associated with another identifier used to identify the remote storage object in accordance with a particular protocol on the first data path, and wherein the first I/O operation includes the another identifier.

18. A system comprising:
- one or more processors; and
- a memory comprising code stored thereon that, when executed by at least a first of the one or more processors, performs a method comprising:
  - establishing a control path session over a control path connection between a first system and a second system;
  - establishing one or more data path connections between the first system and the second system;
  - selecting, over the control path session, a remote storage object of the second system;
  - exposing, over a first target of the second system, the remote storage object of the second system to a first initiator of the first system, wherein the remote storage object is exposed over a first of the one or more data path connections between the first system and the second system and wherein the first data path connection is between the first initiator and the first target;

mapping the remote storage object of the second system to a first local storage object name in the first system, and wherein, as a result of said mapping, the first local storage object name is used in the first system as a proxy to access the remote storage object of the second system as a first local storage object of the first system; and performing first processing on the first system to service a copy operation that copies data between the remote storage object of the second system and a second storage object of the first system, wherein the first processing includes:

creating a first I/O operation in connection with servicing the copy operation, wherein said creating includes translating the first local storage object name associated with the remote storage object to a remote storage object identifier associated with the remote storage object; and issuing the first PO operation, that is directed to the remote storage object, over the first data path connection from the first system to the second system, and wherein the method further comprises:

selecting a first remote system adapter from a plurality of remote system adapters, wherein each of the plurality of remote system adapters corresponds to a different supported remote system type to which the first system is allowed to connect, wherein the first remote system adapter corresponds to a first supported system type, and wherein the second system is the first supported system type.

19. A non-transitory computer readable medium comprising code stored thereon that, when executed by a processor, performs a method comprising:

establishing a control path session over a control path connection between a first system and a second system;

establishing one or more data path connections between the first system and the second system;

selecting, over the control path session, a remote storage object of the second system;

exposing, over a first target of the second system, the remote storage object of the second system to a first initiator of the first system, wherein the remote storage object is exposed over a first of the one or more data path connections between the first system and the second system and wherein the first data path connection is between the first initiator and the first target;

mapping the remote storage object of the second system to a first local storage object name in the first system, and wherein, as a result of said mapping, the first local storage object name is used in the first system as a proxy to access the remote storage object of the second system as a first local storage object of the first system; and performing first processing on the first system to service a copy operation that copies data between the remote storage object of the second system and a second storage object of the first system, wherein the first processing includes:

creating a first I/O operation in connection with servicing the copy operation, wherein said creating includes translating the first local storage object name associated with the remote storage object to a remote storage object identifier associated with the remote storage object; and issuing the first I/O operation, that is directed to the remote storage object, over the first data path connection from the first system to the second system, and wherein the method further comprises:

selecting a first remote system adapter from a plurality of remote system adapters, wherein each of the plurality of remote system adapters corresponds to a different supported remote system type to which the first system is allowed to connect, wherein the first remote system adapter corresponds to a first supported system type, and wherein the second system is the first supported system type.

20. A system comprising:

one or more processors; and a memory comprising code stored thereon that, when executed by at least a first of the one or more processors, performs a method comprising:

establishing a control path session over a control path connection between a first system and a second system;

establishing one or more data path connections between the first system and the second system;

selecting, over the control path session, a remote storage object of the second system;

exposing, over a first target of the second system, the remote storage object of the second system to a first initiator of the first system, wherein the remote storage object is exposed over a first of the one or more data path connections between the first system and the second system and wherein the first data path connection is between the first initiator and the first target;

mapping the remote storage object of the second system to a first local storage object name in the first system, and wherein, as a result of said mapping, the first local storage object name is used in the first system as a proxy to access the remote storage object of the second system as a first local storage object of the first system; and performing first processing on the first system to service a copy operation that copies data between the remote storage object of the second system and a second storage object of the first system, wherein the first processing includes:

creating a first I/O operation in connection with servicing the copy operation, wherein said creating includes translating the first local storage object name associated with the remote storage object to a remote storage object identifier associated with the remote storage object; and issuing the first PO operation, that is directed to the remote storage object, over the first data path connection from the first system to the second system, and wherein the method further includes:

receiving the copy operation at the first system, wherein the copy operation includes the remote storage object identifier denoting the remote storage object, wherein the copy operation includes a second storage object identifier denoting the second storage object, wherein the copy operation identifies one of the remote storage object and the second storage object as a source of the copy operation and identifies another of the remote storage object and the second storage object as a destination of the copy operation, wherein a first table of the first system includes local storage object information describing local storage objects configured in the first system, and wherein a second table of the first system includes information about remote storage objects discovered by the first system; and responsive to receiving the copy operation at the first system, performing third processing including:
  determining, by the first system using the first table, that the remote storage object identifier does not match any local storage object identifier in the first table;
  responsive to determining that the remote storage object identifier does not match any local storage identifier of the first table, determining by the first system that the remote storage object identifier does not identify a local storage object of the first system;
  determining, by the first system, that the remote storage object identifier matches an existing remote storage object identifier included in an entry of the second table, wherein the entry indicates that the existing remote storage object identifier of the entry is mapped to the first local storage object name; and
  responsive to determining the remote storage object identifier matches the existing remote storage object identifier of the entry of the second table, determining that the remote storage object identifier is mapped to the first local storage object name which is used a proxy to access the remote storage object of the second system as the first local storage object of the first system.

21. A non-transitory computer readable medium comprising code stored thereon that, when executed, performs a method comprising:
  establishing a control path session over a control path connection between a first system and a second system;
  establishing one or more data path connections between the first system and the second system;
  selecting, over the control path session, a remote storage object of the second system;
  exposing, over a first target of the second system, the remote storage object of the second system to a first initiator of the first system, wherein the remote storage object is exposed over a first of the one or more data path connections between the first system and the second system and wherein the first data path connection is between the first initiator and the first target;
  mapping the remote storage object of the second system to a first local storage object name in the first system, and wherein, as a result of said mapping, the first local storage object name is used in the first system as a proxy to access the remote storage object of the second system as a first local storage object of the first system; and
  performing first processing on the first system to service a copy operation that copies data between the remote storage object of the second system and a second storage object of the first system, wherein the first processing includes:
    creating a first I/O operation in connection with servicing the copy operation, wherein said creating includes translating the first local storage object name associated with the remote storage object to a remote storage object identifier associated with the remote storage object; and
    issuing the first PO operation, that is directed to the remote storage object, over the first data path connection from the first system to the second system, and wherein the method further includes:
  receiving the copy operation at the first system, wherein the copy operation includes the remote storage object identifier denoting the remote storage object, wherein the copy operation includes a second storage object identifier denoting the second storage object, wherein the copy operation identifies one of the remote storage object and the second storage object as a source of the copy operation and identifies another of the remote storage object and the second storage object as a destination of the copy operation, wherein a first table of the first system includes local storage object information describing local storage objects configured in the first system, and wherein a second table of the first system includes information about remote storage objects discovered by the first system; and
  responsive to receiving the copy operation at the first system, performing third processing including:
    determining, by the first system using the first table, that the remote storage object identifier does not match any local storage object identifier in the first table;
    responsive to determining that the remote storage object identifier does not match any local storage identifier of the first table, determining by the first system that the remote storage object identifier does not identify a local storage object of the first system;
    determining, by the first system, that the remote storage object identifier matches an existing remote storage object identifier included in an entry of the second table, wherein the entry indicates that the existing remote storage object identifier of the entry is mapped to the first local storage object name; and
    responsive to determining the remote storage object identifier matches the existing remote storage object identifier of the entry of the second table, determining that the remote storage object identifier is mapped to the first local storage object name which is used a proxy to access the remote storage object of the second system as the first local storage object of the first system.

\* \* \* \* \*

UNITED STATES PATENT AND TRADEMARK OFFICE
CERTIFICATE OF CORRECTION

PATENT NO. : 11,640,241 B2  
APPLICATION NO. : 17/480586  
DATED : May 2, 2023  
INVENTOR(S) : Prakash Venkatanarayanan et al.

Page 1 of 1

It is certified that error appears in the above-identified patent and that said Letters Patent is hereby corrected as shown below:

In the Claims

Column 49, Line 25:  
In Claim 18, the phrase "issuing the first PO" should read -- issuing the first I/O --

Column 50, Line 53:  
In Claim 20, the phrase "issuing the first PO" should read -- issuing the first I/O --

Column 52, Line 10:  
In Claim 21, the phrase "issuing the first PO" should read -- issuing the first I/O --

Signed and Sealed this  
Sixth Day of June, 2023

Katherine Kelly Vidal  
*Director of the United States Patent and Trademark Office*